US012792040B2

(12) United States Patent
Zhang et al.

(10) Patent No.: US 12,792,040 B2
(45) **Date of Patent: *Nov. 10, 2026**

(54) PREDICTION-BASED SYSTEM AND METHOD FOR TRAJECTORY PLANNING OF AUTONOMOUS VEHICLES

(71) Applicant: TuSimple, Inc., San Diego, CA (US)

(72) Inventors: Xiaomin Zhang, San Diego, CA (US); Yilun Chen, San Diego, CA (US); Guangyu Li, San Diego, CA (US); Xing Sun, San Diego, CA (US); Wutu Lin, San Diego, CA (US); Liu Liu, San Diego, CA (US); Kai-Chieh Ma, San Diego, CA (US); Zijie Xuan, San Diego, CA (US); Yufei Zhao, San Diego, CA (US)

(73) Assignee: CreateAI, Inc., San Diego, CA (US)

( * ) Notice: Subject to any disclaimer, the term of this patent is extended or adjusted under 35 U.S.C. 154(b) by 91 days.

This patent is subject to a terminal disclaimer.

(21) Appl. No.: 18/431,194

(22) Filed: Feb. 2, 2024

(65) Prior Publication Data

US 2024/0168478 A1 May 23, 2024

Related U.S. Application Data

(63) Continuation of application No. 17/006,345, filed on Aug. 28, 2020, now Pat. No. 11,892,846, which is a (Continued)

(51) Int. Cl.

*B60W 60/00* (2020.01)
*G05D 1/00* (2024.01)

(Continued)

(52) U.S. Cl.

CPC ..... *G05D 1/0212* (2013.01); *B60W 60/00276* (2020.02); *G05D 1/228* (2024.01);

(Continued)

(58) Field of Classification Search

CPC .... G05D 1/0212; G05D 1/0088; G05D 1/228; G05D 1/646; G08G 1/161; G08G 1/166; G08G 1/167

(Continued)

(56) References Cited

U.S. PATENT DOCUMENTS

| | | | | |
|---|---|---|---|---|
| 6,265,991 | B1 * | 7/2001 | Nishiwaki | G01S 7/295<br>340/904 |
| 6,777,904 | B1 | 8/2004 | Degner | |

(Continued)

FOREIGN PATENT DOCUMENTS

| | | | |
|---|---|---|---|
| EP | 1754179 | A1 | 2/2007 |
| EP | 2448251 | A2 | 5/2012 |

(Continued)

OTHER PUBLICATIONS

PCT International Search Report and Written Opinion, International Appl. No. PCT/US18/59689, International filing date Nov. 7, 2018, mailing date Apr. 24, 2019.

(Continued)

*Primary Examiner* — Hossam M Abd El Latif
(74) *Attorney, Agent, or Firm* — Ashurst Perkins Coie US LLP

(57) ABSTRACT

A prediction-based system and method for trajectory planning of autonomous vehicles is configured to: receive data from a training data collection system, the training data including perception data and context data corresponding to human driving behaviors; perform a training phase for training a trajectory prediction module using the training data; receive perception data associated with a host vehicle; and perform an operational phase for extracting host vehicle feature data and proximate vehicle context data from the perception data, generating a proposed trajectory for the host vehicle, using the trained trajectory prediction module to (Continued)

generate predicted trajectories for each of one or more proximate vehicles near the host vehicle based on the proposed host vehicle trajectory, determining if the proposed trajectory for the host vehicle will conflict with any of the predicted trajectories of the proximate vehicles, and modifying the proposed trajectory for the host vehicle until conflicts are eliminated.

20 Claims, 11 Drawing Sheets

Related U.S. Application Data continuation of application No. 15/806,013, filed on Nov. 7, 2017, now Pat. No. 10,782,694, which is a continuation-in-part of application No. 15/698,607, filed on Sep. 7, 2017, now Pat. No. 10,649,458.

(51) Int. Cl.
*G05D 1/228* (2024.01)
*G05D 1/646* (2024.01)
*G08G 1/16* (2006.01)

(52) U.S. Cl.
CPC ............ *G05D 1/646* (2024.01); *G08G 1/161* (2013.01); *G08G 1/166* (2013.01); *G08G 1/167* (2013.01)

(58) Field of Classification Search
USPC .......................................................... 701/23
See application file for complete search history.

(56) References Cited

U.S. PATENT DOCUMENTS 7,103,460 B1 9/2006 Breed
7,689,559 B2 3/2010 Canright
7,783,403 B2 8/2010 Breed
7,844,595 B2 11/2010 Canright
8,041,111 B1 10/2011 Wilensky
8,064,643 B2 11/2011 Stein
8,082,101 B2 12/2011 Stein
8,164,628 B2 4/2012 Stein
8,175,376 B2 5/2012 Marchesotti
8,271,871 B2 9/2012 Marchesotti
8,378,851 B2 2/2013 Stein
8,392,117 B2 3/2013 Dolgov
8,401,292 B2 3/2013 Park
8,412,449 B2 4/2013 Trepagnier
8,478,072 B2 7/2013 Aisaka
8,553,088 B2 10/2013 Stein
8,788,134 B1 7/2014 Litkouhi
8,908,041 B2 12/2014 Stein
8,917,169 B2 12/2014 Schofield
8,963,913 B2 2/2015 Baek
8,965,621 B1 2/2015 Urmson
8,981,966 B2 3/2015 Stein
8,993,951 B2 3/2015 Schofield
9,002,632 B1 4/2015 Emigh
9,008,369 B2 4/2015 Schofield
9,025,880 B2 5/2015 Perazzi
9,042,648 B2 5/2015 Wang
9,111,444 B2 8/2015 Kaganovich
9,117,133 B2 8/2015 Barnes
9,118,816 B2 8/2015 Stein
9,120,485 B1 9/2015 Dolgov
9,122,954 B2 9/2015 Srebnik
9,134,402 B2 9/2015 Sebastian
9,145,116 B2 9/2015 Clarke
9,147,255 B1 9/2015 Zhang
9,156,473 B2 10/2015 Clarke
9,176,006 B2 11/2015 Stein
9,179,072 B2 11/2015 Stein
9,183,447 B1 11/2015 Gdalyahu
9,185,360 B2 11/2015 Stein
9,191,634 B2 11/2015 Schofield
9,233,659 B2 1/2016 Rosenbaum
9,233,688 B2 1/2016 Clarke
9,248,832 B2 2/2016 Huberman
9,248,834 B1 2/2016 Ferguson
9,248,835 B2 2/2016 Tanzmeister
9,251,708 B2 2/2016 Rosenbaum
9,277,132 B2 3/2016 Berberian
9,280,711 B2 3/2016 Stein
9,286,522 B2 3/2016 Stein
9,297,641 B2 3/2016 Stein
9,299,004 B2 3/2016 Lin
9,315,192 B1 4/2016 Zhu
9,317,033 B2 4/2016 Ibanez-guzman
9,317,776 B1 4/2016 Honda
9,330,334 B2 5/2016 Lin
9,342,074 B2 5/2016 Dolgov
9,355,635 B2 5/2016 Gao
9,365,214 B2 6/2016 Ben Shalom
9,399,397 B2 7/2016 Mizutani
9,428,192 B2 8/2016 Schofield
9,436,880 B2 9/2016 Bos
9,438,878 B2 9/2016 Niebla
9,443,163 B2 9/2016 Springer
9,446,765 B2 9/2016 Ben Shalom
9,459,515 B2 * 10/2016 Stein .................. G03B 17/566
9,466,006 B2 10/2016 Duan
9,476,970 B1 10/2016 Fairfield
9,490,064 B2 11/2016 Hirosawa
9,531,966 B2 12/2016 Stein
9,535,423 B1 1/2017 Debreczeni
9,555,803 B2 1/2017 Pawlicki
9,568,915 B1 2/2017 Berntorp
9,587,952 B1 3/2017 Slusar
9,672,734 B1 6/2017 Ratnasingam
9,691,286 B2 6/2017 Bahrami
9,720,418 B2 8/2017 Stenneth
9,723,097 B2 8/2017 Harris
9,723,099 B2 8/2017 Chen
9,738,280 B2 8/2017 Rayes
9,746,550 B2 8/2017 Nath
10,019,011 B1 7/2018 Green
10,037,699 B1 7/2018 Toyoda
10,133,275 B1 11/2018 Kobilarov
10,268,200 B2 4/2019 Fang
10,372,135 B2 * 8/2019 Oska .................. B60W 30/095
2007/0230792 A1 10/2007 Shashua
2008/0249667 A1 10/2008 Horvitz
2009/0040054 A1 2/2009 Wang
2010/0049397 A1 2/2010 Lin
2010/0226564 A1 9/2010 Marchesotti
2010/0281361 A1 11/2010 Marchesotti
2011/0206282 A1 8/2011 Aisaka
2012/0105639 A1 5/2012 Stein
2012/0140076 A1 6/2012 Rosenbaum
2012/0274629 A1 11/2012 Baek
2014/0145516 A1 5/2014 Hirosawa
2014/0198184 A1 7/2014 Stein
2015/0062304 A1 3/2015 Stein
2015/0353082 A1 12/2015 Lee
2016/0037064 A1 2/2016 Stein
2016/0094774 A1 3/2016 Li
2016/0129907 A1 5/2016 Kim
2016/0165157 A1 6/2016 Stein
2016/0210528 A1 7/2016 Duan
2016/0314687 A1 10/2016 Koshizen
2016/0321381 A1 11/2016 English
2016/0375907 A1 12/2016 Erban
2017/0010618 A1 * 1/2017 Shashua ............ G01C 21/3644
2017/0120926 A1 5/2017 Yoon
2017/0210378 A1 7/2017 Gunaratne
2018/0286258 A1 10/2018 Derbanne
2018/0374341 A1 12/2018 Branson
2018/0374359 A1 12/2018 Li
2019/0025841 A1 1/2019 Haynes
2019/0034794 A1 1/2019 Ogale
2019/0049987 A1 2/2019 Djuric

(56) References Cited

U.S. PATENT DOCUMENTS

| | | | | |
|---|---|---|---|---|
| 2019/0061763 | A1* | 2/2019 | Takeda | B60W 10/18 |
| 2019/0072965 | A1 | 3/2019 | Zhang | |
| 2019/0072966 | A1 | 3/2019 | Zhang | |
| 2019/0072973 | A1 | 3/2019 | Sun | |
| 2019/0079526 | A1 | 3/2019 | Vallespi-Gonzalez | |
| 2019/0129436 | A1 | 5/2019 | Sun | |
| 2019/0272750 | A1* | 9/2019 | Fukumoto | G08G 1/166 |
| 2019/0325325 | A1 | 10/2019 | Monteil | |
| 2019/0339384 | A1* | 11/2019 | Peng | G05D 1/242 |
| 2021/0163010 | A1* | 6/2021 | Takabayashi | G08G 1/16 |

FOREIGN PATENT DOCUMENTS

| | | | |
|---|---|---|---|
| EP | 2463843 | A2 | 6/2012 |
| EP | 2463843 | A3 | 7/2013 |
| EP | 2761249 | A1 | 8/2014 |
| EP | 2463843 | B1 | 7/2015 |
| EP | 2448251 | A3 | 10/2015 |
| EP | 2946336 | A2 | 11/2015 |
| EP | 2993654 | A1 | 3/2016 |
| EP | 3081419 | A1 | 10/2016 |
| WO | WO/2005/098739 | A1 | 10/2005 |
| WO | WO/2005/098751 | A1 | 10/2005 |
| WO | WO/2005/098782 | | 10/2005 |
| WO | WO/2010/109419 | A1 | 9/2010 |
| WO | WO/2013/045612 | | 4/2013 |
| WO | WO/2014/111814 | A2 | 7/2014 |
| WO | WO/2014/111814 | A3 | 7/2014 |
| WO | WO/2014/201324 | | 12/2014 |
| WO | WO/2015/083009 | | 6/2015 |
| WO | WO/2015/103159 | A1 | 7/2015 |
| WO | WO/2015/125022 | | 8/2015 |
| WO | WO/2015/186002 | A2 | 12/2015 |
| WO | WO/2015/186002 | A3 | 12/2015 |
| WO | WO/2016/135736 | | 9/2016 |
| WO | WO/2017/013875 | A1 | 1/2017 |
| WO | WO2017079349 | | 5/2017 |
| WO | WO2017120336 | A2 | 7/2017 |
| WO | WO2019060927 | A2 | 3/2019 |

OTHER PUBLICATIONS

Hou, Xiaodi and Zhang, Liqing, "Saliency Detection: A Spectral Residual Approach", Computer Vision and Pattern Recognition, CVPR'07—IEEE Conference, pp. 1-8, 2007.

Hou, Xiaodi and Harel, Jonathan and Koch, Christof, "Image Signature: Highlighting Sparse Salient Regions", IEEE Transactions on Pattern Analysis and Machine Intelligence, vol. 34, No. 1, pp. 194-201, 2012.

Hou, Xiaodi and Zhang, Liqing, "Dynamic Visual Attention: Searching for Coding Length Increments", Advances in Neural Information Processing Systems, vol. 21, pp. 681-688, 2008.

Li, Yin and Hou, Xiaodi and Koch, Christof and Rehg, James M. and Yuille, Alan L., "The Secrets of Salient Object Segmentation", Proceedings of the IEEE Conference on Computer Vision and Pattern Recognition, pp. 280-287, 2014.

Zhou, Bolei and Hou, Xiaodi and Zhang, Liqing, "A Phase Discrepancy Analysis of Object Motion", Asian Conference on Computer Vision, pp. 225-238, Springer Berlin Heidelberg, 2010.

Hou, Xiaodi and Yuille, Alan and Koch, Christof, "Boundary Detection Benchmarking: Beyond F-Measures", Computer Vision and Pattern Recognition, CVPR'13, vol. 2013, pp. 1-8, IEEE, 2013.

Hou, Xiaodi and Zhang, Liqing, "Color Conceptualization", Proceedings of the 15th ACM International Conference on Multimedia, pp. 265-268, ACM, 2007.

Hou, Xiaodi and Zhang, Liqing, "Thumbnail Generation Based on Global Saliency", Advances in Cognitive Neurodynamics, ICCN 2007, pp. 999-1003, Springer Netherlands, 2008.

Hou, Xiaodi and Yuille, Alan and Koch, Christof, "A Meta-Theory of Boundary Detection Benchmarks", arXiv preprint arXiv:1302.5985, pp. 1-4, Feb. 25, 2013.

Li, Yanghao and Wang, Naiyan and Shi, Jianping and Liu, Jiaying and Hou, Xiaodi, "Revisiting Batch Normalization for Practical Domain Adaptation", arXiv preprint arXiv:1603.04779, pp. 1-12, Nov. 8, 2016.

Li, Yanghao and Wang, Naiyan and Liu, Jiaying and Hou, Xiaodi, "Demystifying Neural Style Transfer", arXiv preprint arXiv:1701.01036, pp. 1-8, Jan. 4, 2017.

Hou, Xiaodi and Zhang, Liqing, "A Time-Dependent Model of Information Capacity of Visual Attention", International Conference on Neural Information Processing, pp. 127-136, Springer Berlin Heidelberg, 2006.

Wang, Panqu and Chen, Pengfei and Yuan, Ye and Liu, Ding and Huang, Zehua and Hou, Xiaodi and Cottrell, Garrison, "Understanding Convolution for Semantic Segmentation", arXiv preprint arXiv:1702.08502, pp. 1-10, Feb. 27, 2017.

Li, Yanghao and Wang, Naiyan and Liu, Jiaying and Hou, Xiaodi, "Factorized Bilinear Models for Image Recognition", arXiv preprint arXiv:1611.05709, pp. 1-9, Mov. 17, 2016.

Hou, Xiaodi, "Computational Modeling and Psychophysics in Low and Mid-Level Vision", California Institute of Technology, pp. i to xi and 1-114, May 7, 2014.

Spinello, Luciano, Triebel, Rudolph, Siegwart, Roland, "Multiclass Multimodal Detection and Tracking in Urban Environments", Sage Journals, vol. 29 issue: 12, pp. 1498-1515 Article first published online: Oct. 7, 2010; Issue published: Oct. 1, 2010.

Matthew Barth, Carrie Malcolm, Theodore Younglove, and Nicole Hill, "Recent Validation Efforts for a Comprehensive Modal Emissions Model", Transportation Research Record 1750, Paper No. 01-0326, College of Engineering, Center for Environmental Research and Technology, University of California, Riverside, CA 92521, pp. 13-23, Jan. 1, 2001.

Kyoungho Ahn, Hesham Rakha, "The Effects of Route Choice Decisions on Vehicle Energy Consumption and Emissions", Virginia Tech Transportation Institute, Blacksburg, VA 24061, pp. 1-32, May 1, 2008.

Ramos, Sebastian, Gehrig, Stefan, Pinggera, Peter, Franke, Uwe, Rother, Carsten, "Detecting Unexpected Obstacles for Self-Driving Cars: Fusing Deep Learning and Geometric Modeling", arXiv:1612.06573v1 [cs.CV], pp. 1-8, Dec. 20, 2016.

Schroff, Florian, Dmitry Kalenichenko, James Philbin, (Google), "FaceNet: A Unified Embedding for Face Recognition and Clustering", pp. 1-10, CVPR Jun. 17, 2015.

Dai, Jifeng, Kaiming He, Jian Sun, (Microsoft Research), "Instance-aware Semantic Segmentation via Multi-task Network Cascades", pp. 1-10, CVPR Dec. 14, 2015.

Huval, Brody, Tao Wang, Sameep Tandon, Jeff Kiske, Will Song, Joel Pazhayampallil, Mykhaylo Andriluka, Pranav Rajpurkar, Toki Migimatsu, Royce Cheng-Yue, Fernando Mujica, Adam Coates, Andrew Y. Ng, "An Empirical Evaluation of Deep Learning on Highway Driving", arXiv:1504.01716v3 [cs.RO], pp. 1-7, Apr. 17, 2015.

Tian Li, "Proposal Free Instance Segmentation Based on Instance-aware Metric", Department of Computer Science, Cranberry-Lemon University, Pittsburgh, PA., pp. 1-2, 2015.

Mohammad Norouzi, David J. Fleet, Ruslan Salakhutdinov, "Hamming Distance Metric Learning", Departments of Computer Science and Statistics, University of Toronto, pp. 1-9, 2012.

Jain, Suyong Dutt, Grauman, Kristen, "Active Image Segmentation Propagation", In Proceedings of the IEEE Conference on Computer Vision and Pattern Recognition (CVPR), pp. 1-10, Las Vegas, Jun. 2016.

MacAodha, Oisin, Campbell, Neill D.F., Kautz, Jan, Brostow, Gabriel J., "Hierarchical Subquery Evaluation for Active Learning on a Graph", In Proceedings of the IEEE Conference on Computer Vision and Pattern Recognition (CVPR), pp. 1-8, 2014.

Kendall, Alex, Gal, Yarin, "What Uncertainties Do We Need in Bayesian Deep Learning for Computer Vision", arXiv:1703.04977v1 [cs.CV], pp. 1-11, Mar. 15, 2017.

Wei, Junqing, John M. Dolan, Bakhtiar Litkhouhi, "A Prediction—and Cost Function-Based Algorithm for Robust Autonomous Freeway Driving", 2010 IEEE Intelligent Vehicles Symposium, University of California, San Diego, CA, USA, pp. 512-517, Jun. 21-24, 2010.

(56) References Cited

OTHER PUBLICATIONS

Peter Welinder, Steve Branson, Serge Belongie, Pietro Perona, "The Multidimensional Wisdom of Crowds"; http://www.vision.caltech.edu/visipedia/papers/WelinderEtalNIPS10.pdf, pp. 1-9, 2010.

Kai Yu, Yang Zhou, Da Li, Zhang Zhang, Kaiqi Huang, "Large-scale Distributed Video Parsing and Evaluation Platform", Center for Research on Intelligent Perception and Computing, Institute of Automation, Chinese Academy of Sciences, China, arXiv:1611.09580v1 [cs.CV], pp. 1-7, Nov. 29, 2016.

P. Guarneri, G. Rocca and M. Gobbi, "A Neural-Network-Based Model for the Dynamic Simulation of the Tire/Suspension System While Traversing Road Irregularities," in IEEE Transactions on Neural Networks, vol. 19, No. 9, pp. 1549-1563, Sep. 2008.

C. Yang, Z. Li, R. Cui and B. Xu, "Neural Network-Based Motion Control of an Underactuated Wheeled Inverted Pendulum Model," in IEEE Transactions on Neural Networks and Learning Systems, vol. 25, No. 11, pp. 2004-2016, Nov. 2014.

Stephan R. Richter, Vibhav Vineet, Stefan Roth, Vladlen Koltun, "Playing for Data: Ground Truth from Computer Games", Intel Labs, European Conference on Computer Vision (ECCV), Amsterdam, the Netherlands, pp. 1-16, 2016.

Thanos Athanasiadis, Phivos Mylonas, Yannis Avrithis, and Stefanos Kollias, "Semantic Image Segmentation and Object Labeling", IEEE Transactions on Circuits and Systems for Video Technology, vol. 17, No. 3, pp. 298-312, Mar. 2007.

Marius Cordts, Mohamed Omran, Sebastian Ramos, Timo Rehfeld, Markus Enzweiler Rodrigo Benenson, Uwe Franke, Stefan Roth, and Bernt Schiele, "The Cityscapes Dataset for Semantic Urban Scene Understanding", Proceedings of the IEEE Computer Society Conference on Computer Vision and Pattern Recognition (CVPR), Las Vegas, Nevada, pp. 1-11, 2016.

Adhiraj Somani, Nan Ye, David Hsu, and Wee Sun Lee, "Despot: Online POMDP Planning with Regularization", Department of Computer Science, National University of Singapore, pp. 1-9, 2013.

Adam Paszke, Abhishek Chaurasia, Sangpil Kim, and Eugenio Culurciello. Enet: A deep neural network architecture for real-time semantic segmentation. CoRR, abs/1606.02147, pp. 1-10, 2016.

Szeliski, Richard, "Computer Vision: Algorithms and Applications" http://szeliski.org/Book/, pp. i to xxii and 1-957, 2010.

* cited by examiner

402

PREDICTION-BASED SYSTEM AND METHOD FOR TRAJECTORY PLANNING OF AUTONOMOUS VEHICLES

PRIORITY PATENT APPLICATIONS

This is a continuation patent application drawing priority from U.S. non-provisional patent application Ser. No. 17/006,345; filed Aug. 28, 2020; which is a continuation patent application drawing priority from U.S. non-provisional patent application Ser. No. 15/806,013; filed Nov. 7, 2017; which is a continuation-in-part (CIP) patent application drawing priority from U.S. non-provisional patent application Ser. No. 15/698,607; filed Sep. 7, 2017. This present non-provisional CIP patent application draws priority from the referenced patent applications. The entire disclosure of the referenced patent applications is considered part of the disclosure of the present application and is hereby incorporated by reference herein in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever. The following notice applies to the disclosure herein and to the drawings that form a part of this document: Copyright 2016-2024, TuSimple, Inc., All Rights Reserved.

TECHNICAL FIELD

This patent document pertains generally to tools (systems, apparatuses, methodologies, computer program products, etc.) for trajectory planning, vehicle control systems, and autonomous driving systems, and more particularly, but not by way of limitation, to a prediction-based system and method for trajectory planning of autonomous vehicles.

BACKGROUND

An autonomous vehicle is often configured to follow a trajectory based on a computed driving path. However, when variables such as obstacles are present on the driving path, the autonomous vehicle must perform control operations so that the vehicle may be safely driven by changing the driving path to avoid the obstacles.

In the related art, autonomous vehicle control operations have been determined by representing spatial information (e.g., a coordinate, a heading angle, a curvature, etc.) of the driving path as a polynomial expression or mathematical function for a movement distance in order to avoid a stationary obstacle. However, when dynamic obstacles are present on the driving path, the autonomous vehicle according to the related art may not accurately predict whether or not the vehicle will collide with the dynamic obstacles. In particular, the related art does not consider the interaction between the autonomous vehicle and other dynamic vehicles. Therefore, conventional autonomous vehicle control systems cannot accurately predict the future positions of other proximate dynamic vehicles. As a result, the optimal behavior of the conventional autonomous vehicle cannot be achieved. For example, the unexpected behavior of a proximate dynamic obstacle may result in a collision with the conventional autonomous vehicle.

SUMMARY

A prediction-based system and method for trajectory planning of autonomous vehicles is disclosed herein. Specifically, the present disclosure relates to trajectory planning for autonomous vehicles using a prediction-based method. In one aspect, the system herein may include various sensors configured to collect perception data, a computing device, and a trajectory prediction module for predicting a trajectory of other vehicles and/or dynamic objects in the vicinity of (proximate to) a host autonomous vehicle. Initially, the computing device generates a trajectory option, while the trajectory prediction module predicts reactions of vehicles and/or dynamic objects examined using data concerning likely trajectories of each vehicle and/or dynamic objects respectively. Data corresponding to predicted reactions can be sent to the computing device to perfect the trajectory option suggested initially. The computing device may subsequently instruct the trajectory prediction module to further collect data and conduct predictions to complete the trajectory planning process.

BRIEF DESCRIPTION OF THE DRAWINGS

The various embodiments are illustrated by way of example, and not by way of limitation, in the figures of the accompanying drawings in which.

DETAILED DESCRIPTION

In the following description, for purposes of explanation, numerous specific details are set forth in order to provide a thorough understanding of the various embodiments. It will be evident, however, to one of ordinary skill in the art that the various embodiments may be practiced without these specific details.

As described in various example embodiments, a prediction-based system and method for trajectory planning of autonomous vehicles are described herein. An example embodiment disclosed herein can be used in the context of an in-vehicle control system 150 in a vehicle ecosystem 101 shown in FIG. 1. In one example embodiment, an in-vehicle control system 150 with a prediction-based trajectory planning module 200 resident in a vehicle 105 can be configured like the architecture and ecosystem 101 illustrated in FIG. 1. However, it will be apparent to those of ordinary skill in the art that the prediction-based trajectory planning module 200 described and claimed herein can be implemented, configured, and used in a variety of other applications and systems as well.

Figure 1:
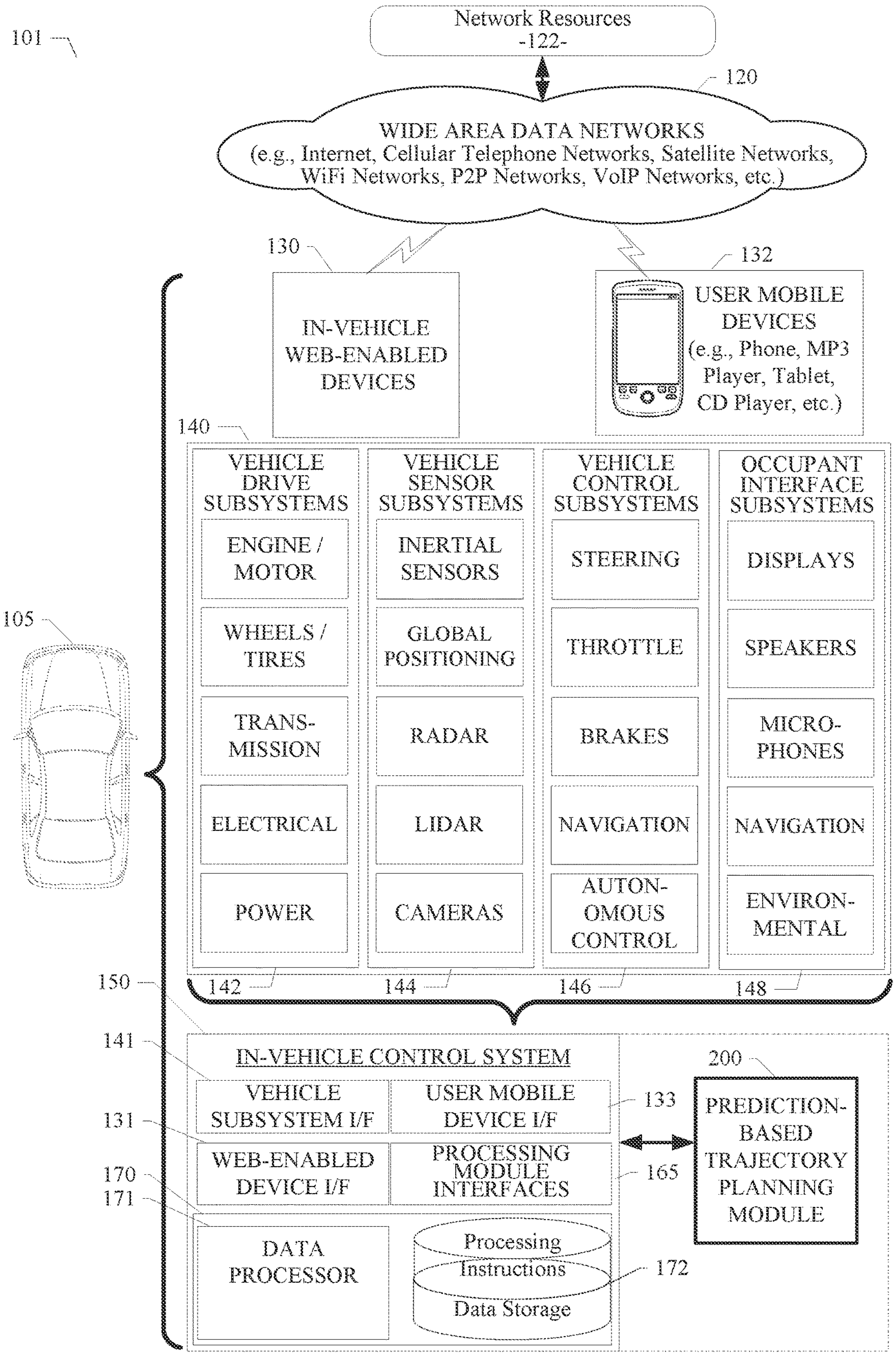
FIG. 1 illustrates a block diagram of an example ecosystem in which a prediction-based trajectory planning module of an example embodiment can be implemented.

Referring now to FIG. 1, a block diagram illustrates an example ecosystem 101 in which an in-vehicle control system 150 and a prediction-based trajectory planning module 200 of an example embodiment can be implemented. These components are described in more detail below. Ecosystem 101 includes a variety of systems and components that can generate and/or deliver one or more sources of information/data and related services to the in-vehicle control system 150 and the prediction-based trajectory planning module 200, which can be installed in the vehicle 105. For example, a camera installed in the vehicle 105, as one of the devices of vehicle subsystems 140, can generate image and timing data that can be received by the in-vehicle control system 150. The in-vehicle control system 150 and an image processing module executing therein can receive this image and timing data input. The image processing module can extract object data from the image and timing data to identify objects in the proximity of the vehicle. As described in more detail below, the prediction-based trajectory planning module 200 can process the object data and generate a trajectory for the vehicle based on the detected objects. The trajectory can be used by an autonomous vehicle control subsystem, as another one of the subsystems of vehicle subsystems 140. The autonomous vehicle control subsystem, for example, can use the real-time generated trajectory to safely and efficiently navigate the vehicle 105 through a real world driving environment while avoiding obstacles and safely controlling the vehicle.

In an example embodiment as described herein, the in-vehicle control system 150 can be in data communication with a plurality of vehicle subsystems 140, all of which can be resident in a user's vehicle 105. A vehicle subsystem interface 141 is provided to facilitate data communication between the in-vehicle control system 150 and the plurality of vehicle subsystems 140. The in-vehicle control system 150 can be configured to include a data processor 171 to execute the prediction-based trajectory planning module 200 for processing object data received from one or more of the vehicle subsystems 140. The data processor 171 can be combined with a data storage device 172 as part of a computing system 170 in the in-vehicle control system 150. The data storage device 172 can be used to store data, processing parameters, and data processing instructions. A processing module interface 165 can be provided to facilitate data communications between the data processor 171 and the prediction-based trajectory planning module 200. In various example embodiments, a plurality of processing modules, configured similarly to prediction-based trajectory planning module 200, can be provided for execution by data processor 171. As shown by the dashed lines in FIG. 1, the prediction-based trajectory planning module 200 can be integrated into the in-vehicle control system 150, optionally downloaded to the in-vehicle control system 150, or deployed separately from the in-vehicle control system 150.

The in-vehicle control system 150 can be configured to receive or transmit data from/to a wide-area network 120 and network resources 122 connected thereto. An in-vehicle web-enabled device 130 and/or a user mobile device 132 can be used to communicate via network 120. A web-enabled device interface 131 can be used by the in-vehicle control system 150 to facilitate data communication between the in-vehicle control system 150 and the network 120 via the in-vehicle web-enabled device 130. Similarly, a user mobile device interface 133 can be used by the in-vehicle control system 150 to facilitate data communication between the in-vehicle control system 150 and the network 120 via the user mobile device 132. In this manner, the in-vehicle control system 150 can obtain real-time access to network resources 122 via network 120. The network resources 122 can be used to obtain processing modules for execution by data processor 171, data content to train internal neural networks, system parameters, or other data.

The ecosystem 101 can include a wide area data network 120. The network 120 represents one or more conventional wide area data networks, such as the Internet, a cellular telephone network, satellite network, pager network, a wireless broadcast network, gaming network, WiFi network, peer-to-peer network, Voice over IP (VOIP) network, etc. One or more of these networks 120 can be used to connect a user or client system with network resources 122, such as websites, servers, central control sites, or the like. The network resources 122 can generate and/or distribute data, which can be received in vehicle 105 via in-vehicle web-enabled devices 130 or user mobile devices 132. The network resources 122 can also host network cloud services, which can support the functionality used to compute or assist in processing object input or object input analysis. Antennas can serve to connect the in-vehicle control system 150 and the prediction-based trajectory planning module 200 with the data network 120 via cellular, satellite, radio, or other conventional signal reception mechanisms. Such cellular data networks are currently available (e.g., Verizon™, AT&T™, T-Mobile™, etc.). Such satellite-based data or content networks are also currently available (e.g., SiriusXM™, HughesNet™, etc.). The conventional broadcast networks, such as AM/FM radio networks, pager networks, UHF networks, gaming networks, WiFi networks, peer-to-peer networks, Voice over IP (VOIP) networks, and the like are also well-known. Thus, as described in more detail below, the in-vehicle control system 150 and the prediction-based trajectory planning module 200 can receive web-based data or content via an in-vehicle web-enabled device interface 131, which can be used to connect with the in-vehicle web-enabled device receiver 130 and network 120. In this manner, the in-vehicle control system 150 and the prediction-based trajectory planning module 200 can support a variety of network-connectable in-vehicle devices and systems from within a vehicle 105.

As shown in FIG. 1, the in-vehicle control system 150 and the prediction-based trajectory planning module 200 can also receive data, object processing control parameters, and training content from user mobile devices 132, which can be located inside or proximately to the vehicle 105. The user mobile devices 132 can represent standard mobile devices, such as cellular phones, smartphones, personal digital assistants (PDA's), MP3 players, tablet computing devices (e.g., iPad™), laptop computers, CD players, and other mobile devices, which can produce, receive, and/or deliver data, object processing control parameters, and content for the in-vehicle control system 150 and the prediction-based trajectory planning module 200. As shown in FIG. 1, the mobile devices 132 can also be in data communication with the network cloud 120. The mobile devices 132 can source data and content from internal memory components of the mobile devices 132 themselves or from network resources 122 via network 120. Additionally, mobile devices 132 can themselves include a GPS data receiver, accelerometers, WiFi triangulation, or other geo-location sensors or components in the mobile device, which can be used to determine the real-time geo-location of the user (via the mobile device) at any moment in time. In any case, the in-vehicle control system 150 and the prediction-based trajectory planning module 200 can receive data from the mobile devices 132 as shown in FIG. 1.

Referring still to FIG. 1, the example embodiment of ecosystem 101 can include vehicle operational subsystems 140. For embodiments that are implemented in a vehicle 105, many standard vehicles include operational subsystems, such as electronic control units (ECUs), supporting monitoring/control subsystems for the engine, brakes, transmission, electrical system, emissions system, interior environment, and the like. For example, data signals communicated from the vehicle operational subsystems 140 (e.g., ECUs of the vehicle 105) to the in-vehicle control system 150 via vehicle subsystem interface 141 may include information about the state of one or more of the components or subsystems of the vehicle 105. In particular, the data signals, which can be communicated from the vehicle operational subsystems 140 to a Controller Area Network (CAN) bus of the vehicle 105, can be received and processed by the in-vehicle control system 150 via vehicle subsystem interface 141. Embodiments of the systems and methods described herein can be used with substantially any mechanized system that uses a CAN bus or similar data communications bus as defined herein, including, but not limited to, industrial equipment, boats, trucks, machinery, or automobiles; thus, the term "vehicle" as used herein can include any such mechanized systems. Embodiments of the systems and methods described herein can also be used with any systems employing some form of network data communications; however, such network communications are not required.

Referring still to FIG. 1, the example embodiment of ecosystem 101, and the vehicle operational subsystems 140 therein, can include a variety of vehicle subsystems in support of the operation of vehicle 105. In general, the vehicle 105 may take the form of a car, truck, motorcycle, bus, boat, airplane, helicopter, lawn mower, earth mover, snowmobile, aircraft, recreational vehicle, amusement park vehicle, farm equipment, construction equipment, tram, golf cart, train, and trolley, for example. Other vehicles are possible as well. The vehicle 105 may be configured to operate fully or partially in an autonomous mode. For example, the vehicle 105 may control itself while in the autonomous mode, and may be operable to determine a current state of the vehicle and its context in its environment, determine a predicted behavior of at least one other vehicle in the context of the environment, determine a confidence level that may correspond to a likelihood of the at least one other vehicle to perform the predicted behavior, and control the vehicle 105 based on the determined information. While in autonomous mode, the vehicle 105 may be configured to operate without human interaction.

The vehicle 105 may include various vehicle subsystems such as a vehicle drive subsystem 142, vehicle sensor subsystem 144, vehicle control subsystem 146, and occupant interface subsystem 148. As described above, the vehicle 105 may also include the in-vehicle control system 150, the computing system 170, and the prediction-based trajectory planning module 200. The vehicle 105 may include more or fewer subsystems and each subsystem could include multiple elements. Further, each of the subsystems and elements of vehicle 105 could be interconnected. Thus, one or more of the described functions of the vehicle 105 may be divided up into additional functional or physical components or combined into fewer functional or physical components. In some further examples, additional functional and physical components may be added to the examples illustrated by FIG. 1.

The vehicle drive subsystem 142 may include components operable to provide powered motion for the vehicle 105. In an example embodiment, the vehicle drive subsystem 142 may include an engine or motor, wheels/tires, a transmission, an electrical subsystem, and a power source. The engine or motor may be any combination of an internal combustion engine, an electric motor, steam engine, fuel cell engine, propane engine, or other types of engines or motors. In some example embodiments, the engine may be configured to convert a power source into mechanical energy. In some example embodiments, the vehicle drive subsystem 142 may include multiple types of engines or motors. For instance, a gas-electric hybrid car could include a gasoline engine and an electric motor. Other examples are possible.

The wheels of the vehicle 105 may be standard tires. The wheels of the vehicle 105 may be configured in various formats, including a unicycle, bicycle, tricycle, or a four-wheel format, such as on a car or a truck, for example. Other wheel geometries are possible, such as those including six or more wheels. Any combination of the wheels of vehicle 105 may be operable to rotate differentially with respect to other wheels. The wheels may represent at least one wheel that is fixedly attached to the transmission and at least one tire coupled to a rim of the wheel that could make contact with the driving surface. The wheels may include a combination of metal and rubber, or another combination of materials. The transmission may include elements that are operable to transmit mechanical power from the engine to the wheels. For this purpose, the transmission could include a gearbox, a clutch, a differential, and drive shafts. The transmission may include other elements as well. The drive shafts may include one or more axles that could be coupled to one or more wheels. The electrical system may include elements that are operable to transfer and control electrical signals in the vehicle 105. These electrical signals can be used to activate lights, servos, electrical motors, and other electrically driven or controlled devices of the vehicle 105. The power source may represent a source of energy that may, in full or in part, power the engine or motor. That is, the engine or motor could be configured to convert the power source into mechanical energy. Examples of power sources include gasoline, diesel, other petroleum-based fuels, propane, other compressed gas-based fuels, ethanol, fuel cell, solar panels, batteries, and other sources of electrical power. The power source could additionally or alternatively include any combination of fuel tanks, batteries, capacitors, or flywheels. The power source may also provide energy for other subsystems of the vehicle 105.

The vehicle sensor subsystem 144 may include a number of sensors configured to sense information about an environment or condition of the vehicle 105. For example, the vehicle sensor subsystem 144 may include an inertial measurement unit (IMU), a Global Positioning System (GPS)

transceiver, a RADAR unit, a laser range finder/LIDAR unit, and one or more cameras or image capture devices. The vehicle sensor subsystem 144 may also include sensors configured to monitor internal systems of the vehicle 105 (e.g., an O2 monitor, a fuel gauge, an engine oil temperature). Other sensors are possible as well. One or more of the sensors included in the vehicle sensor subsystem 144 may be configured to be actuated separately or collectively in order to modify a position, an orientation, or both, of the one or more sensors.

The IMU may include any combination of sensors (e.g., accelerometers and gyroscopes) configured to sense position and orientation changes of the vehicle 105 based on inertial acceleration. The GPS transceiver may be any sensor configured to estimate a geographic location of the vehicle 105. For this purpose, the GPS transceiver may include a receiver/transmitter operable to provide information regarding the position of the vehicle 105 with respect to the Earth. The RADAR unit may represent a system that utilizes radio signals to sense objects within the local environment of the vehicle 105. In some embodiments, in addition to sensing the objects, the RADAR unit may additionally be configured to sense the speed and the heading of the objects proximate to the vehicle 105. The laser range finder or LIDAR unit may be any sensor configured to sense objects in the environment in which the vehicle 105 is located using lasers. In an example embodiment, the laser range finder/LIDAR unit may include one or more laser sources, a laser scanner, and one or more detectors, among other system components. The laser range finder/LIDAR unit could be configured to operate in a coherent (e.g., using heterodyne detection) or an incoherent detection mode. The cameras may include one or more devices configured to capture a plurality of images of the environment of the vehicle 105. The cameras may be still image cameras or motion video cameras.

The vehicle control system 146 may be configured to control operation of the vehicle 105 and its components. Accordingly, the vehicle control system 146 may include various elements such as a steering unit, a throttle, a brake unit, a navigation unit, and an autonomous control unit.

The steering unit may represent any combination of mechanisms that may be operable to adjust the heading of vehicle 105. The throttle may be configured to control, for instance, the operating speed of the engine and, in turn, control the speed of the vehicle 105. The brake unit can include any combination of mechanisms configured to decelerate the vehicle 105. The brake unit can use friction to slow the wheels in a standard manner. In other embodiments, the brake unit may convert the kinetic energy of the wheels to electric current. The brake unit may take other forms as well. The navigation unit may be any system configured to determine a driving path or route for the vehicle 105. The navigation unit may additionally be configured to update the driving path dynamically while the vehicle 105 is in operation. In some embodiments, the navigation unit may be configured to incorporate data from the prediction-based trajectory planning module 200, the GPS transceiver, and one or more predetermined maps so as to determine the driving path for the vehicle 105. The autonomous control unit may represent a control system configured to identify, evaluate, and avoid or otherwise negotiate potential obstacles in the environment of the vehicle 105. In general, the autonomous control unit may be configured to control the vehicle 105 for operation without a driver or to provide driver assistance in controlling the vehicle 105. In some embodiments, the autonomous control unit may be configured to incorporate data from the prediction-based trajectory planning module 200, the GPS transceiver, the RADAR, the LIDAR, the cameras, and other vehicle subsystems to determine the driving path or trajectory for the vehicle 105. The vehicle control system 146 may additionally or alternatively include components other than those shown and described.

Occupant interface subsystems 148 may be configured to allow interaction between the vehicle 105 and external sensors, other vehicles, other computer systems, and/or an occupant or user of vehicle 105. For example, the occupant interface subsystems 148 may include standard visual display devices (e.g., plasma displays, liquid crystal displays (LCDs), touchscreen displays, heads-up displays, or the like), speakers or other audio output devices, microphones or other audio input devices, navigation interfaces, and interfaces for controlling the internal environment (e.g., temperature, fan, etc.) of the vehicle 105.

In an example embodiment, the occupant interface subsystems 148 may provide, for instance, means for a user/occupant of the vehicle 105 to interact with the other vehicle subsystems. The visual display devices may provide information to a user of the vehicle 105. The user interface devices can also be operable to accept input from the user via a touchscreen. The touchscreen may be configured to sense at least one of a position and a movement of a user's finger via capacitive sensing, resistance sensing, or a surface acoustic wave process, among other possibilities. The touchscreen may be capable of sensing finger movement in a direction parallel or planar to the touchscreen surface, in a direction normal to the touchscreen surface, or both, and may also be capable of sensing a level of pressure applied to the touchscreen surface. The touchscreen may be formed of one or more translucent or transparent insulating layers and one or more translucent or transparent conducting layers. The touchscreen may take other forms as well.

In other instances, the occupant interface subsystems 148 may provide means for the vehicle 105 to communicate with devices within its environment. The microphone may be configured to receive audio (e.g., a voice command or other audio input) from a user of the vehicle 105. Similarly, the speakers may be configured to output audio to a user of the vehicle 105. In one example embodiment, the occupant interface subsystems 148 may be configured to wirelessly communicate with one or more devices directly or via a communication network. For example, a wireless communication system could use 3G cellular communication, such as CDMA, EVDO, GSM/GPRS, or 4G cellular communication, such as WiMAX or LTE. Alternatively, the wireless communication system may communicate with a wireless local area network (WLAN), for example, using WIFI®. In some embodiments, the wireless communication system 146 may communicate directly with a device, for example, using an infrared link, BLUETOOTH®, or ZIGBEE®. Other wireless protocols, such as various vehicular communication systems, are possible within the context of the disclosure. For example, the wireless communication system may include one or more dedicated short range communications (DSRC) devices that may include public or private data communications between vehicles and/or roadside stations.

Many or all of the functions of the vehicle 105 can be controlled by the computing system 170. The computing system 170 may include at least one data processor 171 (which can include at least one microprocessor) that executes processing instructions stored in a non-transitory computer readable medium, such as the data storage device 172. The computing system 170 may also represent a plurality of computing devices that may serve to control individual components or subsystems of the vehicle 105 in a distributed fashion. In some embodiments, the data storage device 172 may contain processing instructions (e.g., program logic) executable by the data processor 171 to perform various functions of the vehicle 105, including those described herein in connection with the drawings. The data storage device 172 may contain additional instructions as well, including instructions to transmit data to, receive data from, interact with, or control one or more of the vehicle drive subsystem 140, the vehicle sensor subsystem 144, the vehicle control subsystem 146, and the occupant interface subsystems 148.

In addition to the processing instructions, the data storage device 172 may store data such as object processing parameters, training data, roadway maps, and path information, among other information. Such information may be used by the vehicle 105 and the computing system 170 during the operation of the vehicle 105 in the autonomous, semi-autonomous, and/or manual modes.

The vehicle 105 may include a user interface for providing information to or receiving input from a user or occupant of the vehicle 105. The user interface may control or enable control of the content and the layout of interactive images that may be displayed on a display device. Further, the user interface may include one or more input/output devices within the set of occupant interface subsystems 148, such as the display device, the speakers, the microphones, or a wireless communication system.

The computing system 170 may control the function of the vehicle 105 based on inputs received from various vehicle subsystems (e.g., the vehicle drive subsystem 140, the vehicle sensor subsystem 144, and the vehicle control subsystem 146), as well as from the occupant interface subsystem 148. For example, the computing system 170 may use input from the vehicle control system 146 in order to control the steering unit to avoid an obstacle detected by the vehicle sensor subsystem 144 and follow a path or trajectory generated by the prediction-based trajectory planning module 200. In an example embodiment, the computing system 170 can be operable to provide control over many aspects of the vehicle 105 and its subsystems.

Although FIG. 1 shows various components of vehicle 105, e.g., vehicle subsystems 140, computing system 170, data storage device 172, and prediction-based trajectory planning module 200, as being integrated into the vehicle 105, one or more of these components could be mounted or associated separately from the vehicle 105. For example, data storage device 172 could, in part or in full, exist separate from the vehicle 105. Thus, the vehicle 105 could be provided in the form of device elements that may be located separately or together. The device elements that make up vehicle 105 could be communicatively coupled together in a wired or wireless fashion.

Additionally, other data and/or content (denoted herein as ancillary data) can be obtained from local and/or remote sources by the in-vehicle control system 150 as described above. The ancillary data can be used to augment, modify, or train the operation of the prediction-based trajectory planning module 200 based on a variety of factors including, the context in which the user is operating the vehicle (e.g., the location of the vehicle, the specified destination, direction of travel, speed, the time of day, the status of the vehicle, etc.), and a variety of other data obtainable from the variety of sources, local and remote, as described herein.

In a particular embodiment, the in-vehicle control system 150 and the prediction-based trajectory planning module 200 can be implemented as in-vehicle components of vehicle 105. In various example embodiments, the in-vehicle control system 150 and the prediction-based trajectory planning module 200 in data communication therewith can be implemented as integrated components or as separate components. In an example embodiment, the software components of the in-vehicle control system 150 and/or the prediction-based trajectory planning module 200 can be dynamically upgraded, modified, and/or augmented by use of the data connection with the mobile devices 132 and/or the network resources 122 via network 120. The in-vehicle control system 150 can periodically query a mobile device 132 or a network resource 122 for updates or updates can be pushed to the in-vehicle control system 150.

Prediction-Based System and Method for Trajectory Planning of Autonomous Vehicles As described in various example embodiments, a prediction-based system and method for trajectory planning of autonomous vehicles are described herein. Specifically, the present disclosure relates to trajectory planning for autonomous vehicles using a prediction-based method. In one aspect, the system herein may include various sensors configured to collect perception data, a computing device, and a trajectory prediction module for predicting a trajectory of other vehicles and/or dynamic objects in the vicinity of (proximate to) the host autonomous vehicle. Initially, the computing device generates a trajectory option, while the trajectory prediction module predicts reactions of vehicles and/or dynamic objects examined using data concerning likely trajectories of each vehicle and/or dynamic objects respectively. Data corresponding to predicted reactions can be sent to the computing device to perfect the trajectory option suggested initially. The computing device may subsequently instruct the trajectory prediction module to further collect data and conduct predictions to complete the trajectory planning process.

The disclosed embodiments take advantage of the perception information, which includes status and context information from a host autonomous vehicle to predict the behavior of the proximate vehicles that might have an influence on the host vehicle. An example embodiment uses machine learning techniques to analyze the massive perception and context data recorded from the behavior of vehicles and drivers in real world traffic environments. This analysis of the perception and context data enables the embodiments to accurately predict the behavior of proximate vehicles and objects for a context in which the host vehicle is operating. Once the predicted behavior of proximate vehicles and objects is determined, the example embodiments can use a motion planning process to generate the predicted trajectory for each of the proximate vehicles. The predicted trajectory for each of the proximate vehicles can be compared with the desired or proposed trajectory for the host vehicle and potential conflicts can be determined. The trajectory for the host vehicle can be modified to avoid the potential conflicts with the proximate vehicles. One purpose of the prediction-based system and method for trajectory planning is to avoid collision of the host vehicle with other proximate vehicles and objects on the road. Other traditional methods for collision avoidance use only the historical information from the host vehicle itself. As described in detail herein, the various embodiments use context information of the host vehicle and proximate vehicles to predict the behavior and trajectories of the vehicles based on training data. As a result, the prediction-based trajectory planning system of the example embodiments can effectively control an autonomous vehicle in traffic.

Figure 2:
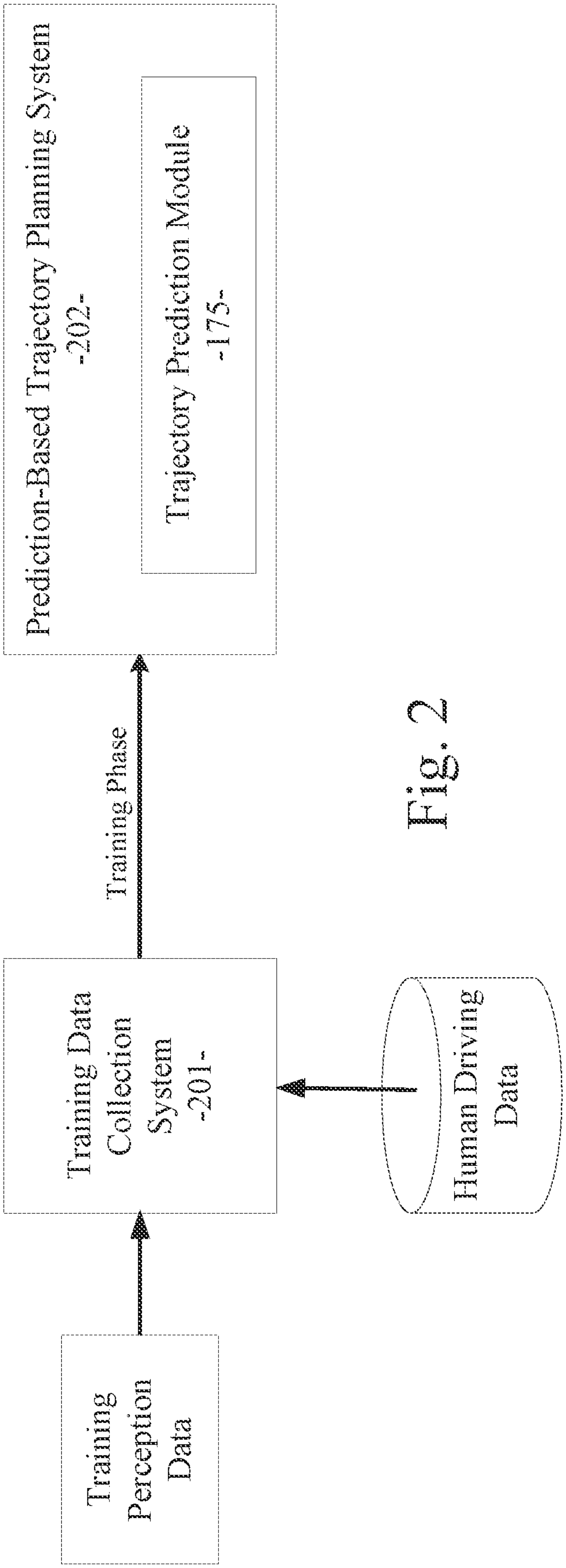
FIG. 2 illustrates an offline training phase for training and building a prediction-based trajectory planning system in an example embodiment.

Referring now to FIG. 2, an example embodiment disclosed herein can be used in the context of a prediction-based trajectory planning system 202 for autonomous vehicles. In an example embodiment, the prediction-based trajectory planning system 202 can include a trajectory prediction module 175 (described in more detail below), which can be implemented as a machine learning system, neural network, or the like. As such, the example embodiment can be implemented in two phases: an offline training phase and an operational phase. The training phase is used to train and configure the parameters of the machine learning system or neural network of the trajectory prediction module 175 or any other component of the prediction-based trajectory planning system 202 implemented with a machine learning system or neural network. The operational phase is used after the machine learning components have been trained and are ready to support the generation of predicted vehicle or object trajectories as described in more detail below.

Referring again to FIG. 2, the offline training phase for training and building a prediction-based trajectory planning system in an example embodiment is illustrated. In the training phase, the training data collection system 201 can be used to generate, train, and/or configure the trajectory prediction module 175 or any other machine learning components of the prediction-based trajectory planning system 202. As described in more detail below for an example embodiment, the prediction-based trajectory planning system 202 can use the trained and configured trajectory prediction module 175 during the operational phase to generate predicted vehicle or object trajectories based on perception data provided to the prediction-based trajectory planning system 202 and based on the training the trajectory prediction module 175 receives from the training data collection system 201 during the training phase.

The training data collection system 201 can include a plurality of training data gathering mechanisms including obtaining training data or training images from a library or human driving database, and obtaining training data or training images from an array of perception information gathering devices or sensors that may include image generating devices (e.g., cameras), light amplification by stimulated emission of radiation (laser) devices, light detection and ranging (LIDAR) devices, global positioning system (GPS) devices, sound navigation and ranging (sonar) devices, radio detection and ranging (radar) devices, and the like. The perception information gathered by the information gathering devices at various traffic locations can include traffic or vehicle image data, roadway data, environmental data, distance data from LIDAR or radar devices, and other sensor information received from the information gathering devices of the training data collection system 201 positioned adjacent to particular roadways (e.g., monitored locations). Additionally, the training data collection system 201 can include information gathering devices installed in moving test vehicles being navigated through pre-defined routings in an environment or location of interest. The perception information can include data from which a position and velocity of neighboring vehicles in the vicinity of or proximate to the autonomous vehicle or host vehicle can be obtained or calculated. Corresponding ground truth data can also be gathered by the training data collection system 201. As a result, the perception information, ground truth data, and other available information can be obtained, processed, and used to build a training dataset for training and configuring the machine learning components of the prediction-based trajectory planning system 202.

The training data collection system 201 can thereby collect actual trajectories of vehicles and corresponding ground truth data under different scenarios and different driver actions and intentions in a context. The different scenarios can correspond to different locations, different traffic patterns, different environmental conditions, and the like. The scenarios can be represented, for example, by an occupancy grid, a collection of vehicle states on a map, or a graphical representation, such as a top-down image of one or more areas of interest. The driver actions, behaviors, and intentions can correspond to a driver's short term driving goals, such as turning left or right, accelerating or decelerating, merging, making right turn at an intersection, making a U-turn, and the like. The driver actions, behaviors, and intentions can also correspond to a set of driver or vehicle control actions to accomplish a particular short term driving goal.

The image data and other perception data, ground truth data, context data, and other training data collected by the training data collection system 201 reflects truly realistic, real-world traffic information related to the locations or routings, the scenarios, and the driver actions, behaviors, and intentions being monitored. Using the standard capabilities of well-known data collection devices, the gathered traffic and vehicle image data and other perception or sensor data can be wirelessly transferred (or otherwise transferred) to a data processor of a standard computing system, upon which the training data collection system 201 can be executed. Alternatively, the gathered traffic and vehicle image data and other perception or sensor data can be stored in a memory device at the monitored location or in the test vehicle and transferred later to the data processor of the standard computing system. The traffic and vehicle image data and other perception or sensor data, the ground truth data, the driver action and intention data, and other related data gathered or calculated by the training data collection system 201 can be used to generate the training data, which can be used to build, train, and/or configure the trajectory prediction module 175 in the training phase. For example, as well-known, neural networks or other machine learning systems can be trained to produce configured output based on training data provided to the neural network or other machine learning system in a training phase. The training data provided by the training data collection system 201 can be used to build, train, and/or configure the trajectory prediction module 175 or any other machine learning components of the prediction-based trajectory planning system 202 to generate predicted vehicle or object trajectories given a current context and the training received during the training phase. As a result, the prediction-based trajectory planning system 202 can use the trained trajectory prediction module 175 and the real-world perception data 210 (shown in FIG. 6) in the operational phase to generate proximate vehicle or object trajectories. Thus, the example embodiments use the training data collection system 201 to collect context data corresponding to human driving behaviors and then use the prediction-based trajectory planning system 202 and the trained trajectory prediction module 175 therein to generate predicted vehicle trajectories based on the human driving behaviors. Additionally during the training phase, the example embodiments can use a loss function to examine and correct the results of the training provided to the trajectory prediction module 175 by the training data collection system 201. Because the trajectory prediction module 175 is trained in the training phase using real world, human behavior data, the predicted behavior and trajectories of vehicles or objects produced by the trajectory prediction module 175 are closely correlated to the actual behavior and trajectories of vehicles in real world environments with human drivers and based on a human driver behavior model implemented by the training data collection system 201.

Figure 3:
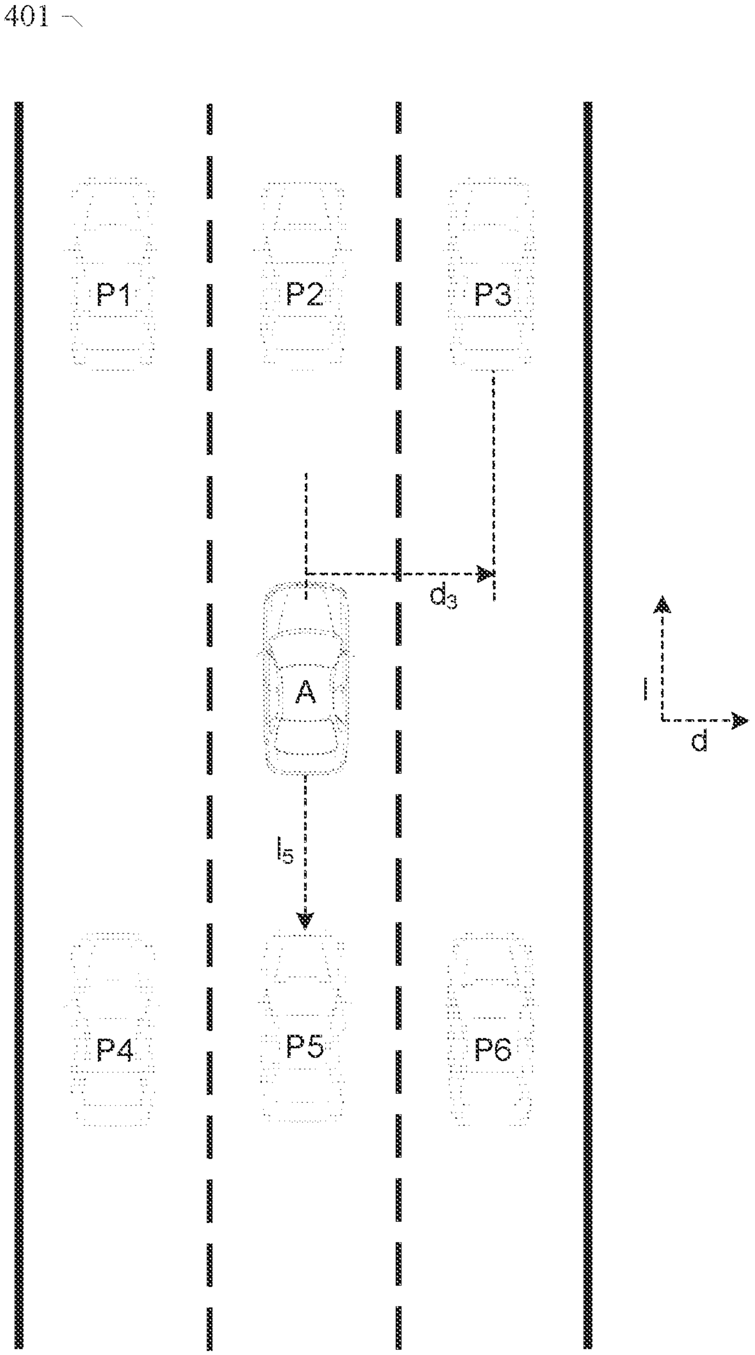
FIGS. 3 and 4 illustrate examples of the context data used to train the trajectory prediction module in the offline training phase.

FIG. 3 illustrates an example 401 of the context data used to train the trajectory prediction module 175 in the offline training phase. In the example 401, a host vehicle marked A is shown in a center lane of a three-lane roadway. As shown in the example 401, the host vehicle A can be operating in a context in which vehicles or objects in any of six proximate vehicles locations (P1, P2, . . . P6) can be operating nearby or proximate to the location of the host vehicle A. In the example 401, a leading proximate vehicle P2 is driving in the same lane as the host vehicle A and ahead of the host vehicle A. The following vehicle P5 is driving in the same lane as the host vehicle A and behind the host vehicle A. The proximate vehicle P1 is driving in the lane to the left of the lane occupied by the host vehicle A and ahead of the host vehicle A. The proximate vehicle P3 is driving in the lane to the right of the lane occupied by the host vehicle A and ahead of the host vehicle A. The proximate vehicle P4 is driving in the lane to the left of the lane occupied by the host vehicle A and behind the host vehicle A. The proximate vehicle P6 is driving in the lane to the right of the lane occupied by the host vehicle A and behind the host vehicle A. As such, host vehicle A can be positioned in a context relative to the six proximate vehicle locations (P1, P2, . . . P6) illustrated in FIG. 3. It will be apparent to those of ordinary skill in the art in view of the disclosure herein that a different number of proximate vehicle positions can be equivalently used to define a context for the host vehicle A. Moreover, it will be understood by those of ordinary skill in the art in view of the disclosure herein that not all of the proximate vehicle positions may be occupied by an actual vehicle or object in a real world scenario. In an example embodiment, a coordinate system (1, d) can be used to define the location of the host vehicle A relative to the six proximate vehicle locations (P1, P2, . . . P6). In one embodiment, the 1 axis can be aligned parallel with the lane markers of the roadway. The d axis can be oriented perpendicularly to the 1 axis and the lane markers of the roadway. As a result, the position of the host vehicle A relative to the six proximate vehicle locations (P1, P2, . . . P6) can be readily determined. In an alternative embodiment, the position of the host vehicle A and the six proximate vehicle locations (P1, P2, . . . P6) can be represented with world coordinates, GPS coordinates, or the like. It will be apparent to those of ordinary skill in the art in view of the disclosure herein that a different coordinate system can be equivalently used to define a position of the host vehicle A relative to the six proximate vehicle locations (P1, P2, . . . P6). The coordinate system provides a convenient and accurate way to generate coordinate transformations to virtually shift the position of the host vehicle A to or from any of the six proximate vehicle locations (P1, P2, . . . P6). As described in more detail below, this coordinate transformation is useful for shifting perception data captured by the host vehicle A to a context corresponding to any of the six proximate vehicle locations (P1, P2, . . . P6).

Figure 4:
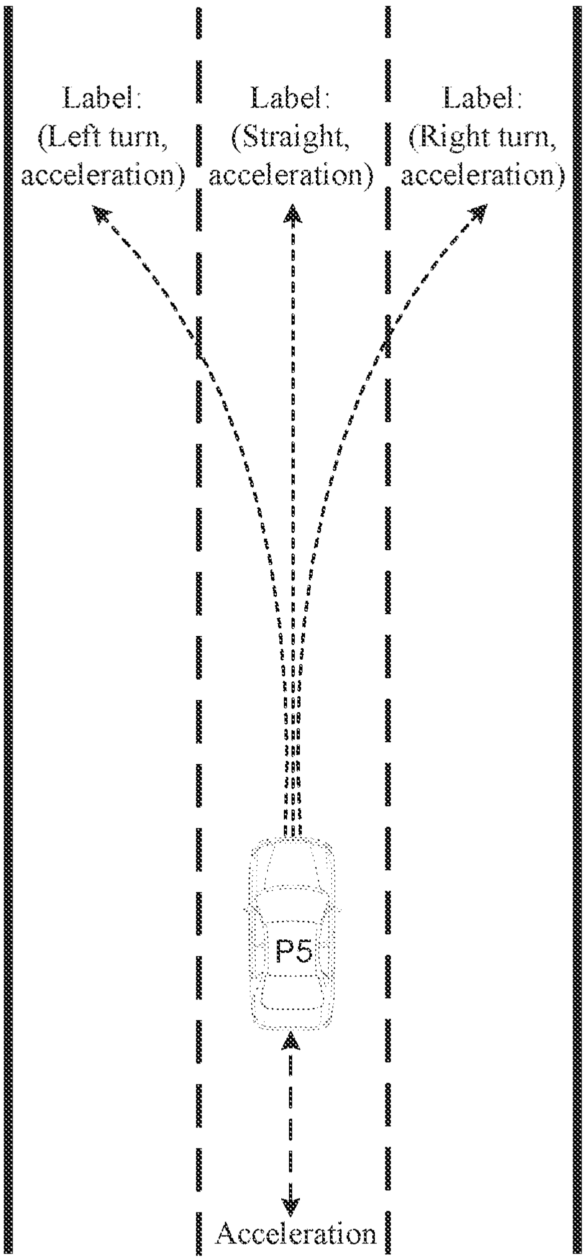

Referring now to FIG. 4, the context data used to train the trajectory prediction module 175 in the offline training phase is further illustrated in an example embodiment. In the example 402, the proximate vehicle P5 is shown in a center lane of a three-lane roadway. A similar example can apply to each of the six proximate vehicle locations (P1, P2, . . . P6). Vehicles or objects operating in each of the proximate vehicles locations (P1, P2, . . . P6) typically behave in three basic ways with respect to heading or direction of travel and one basic way with respect to rate or acceleration. As shown in FIG. 4, the three basic directionality behaviors of the proximate vehicles with respect to heading or direction of travel are: 1) left turn, 2) straight [no turn], and 3) right turn. The one basic rate behavior of the proximate vehicles is acceleration or deceleration. The directionality and rate behaviors of the proximate vehicles can be used when the training data is generated to enable the trajectory prediction module 175 to learn and thus, predict the likely behavior of proximate vehicles based on the human driving data embodied in the training data. For example, images included in the training data can be labeled using human labelers or automated processes to associate a label having behavior and direction information with each instance of a vehicle in the training data. In the example embodiment, regression techniques can be used for acceleration prediction using the human driving data to produce a regressing model for acceleration prediction. As shown in FIG. 4, the labels or labeling data can include context information that defines the directionality and rate behaviors of the vehicles represented in the training data. When this training data is used to train the trajectory prediction module 175 in the training phase, the trajectory prediction module 175 will retain information related to the context and behaviors of vehicles in real world environments. This vehicle context and behavior information can be used by the trajectory prediction module 175 to infer the likely behaviors of the proximate vehicles given a similar context. As a result, the trajectory prediction module 175 can be trained and configured to perform intention, behavior, and trajectory prediction relative to proximate vehicles.

Figure 5:
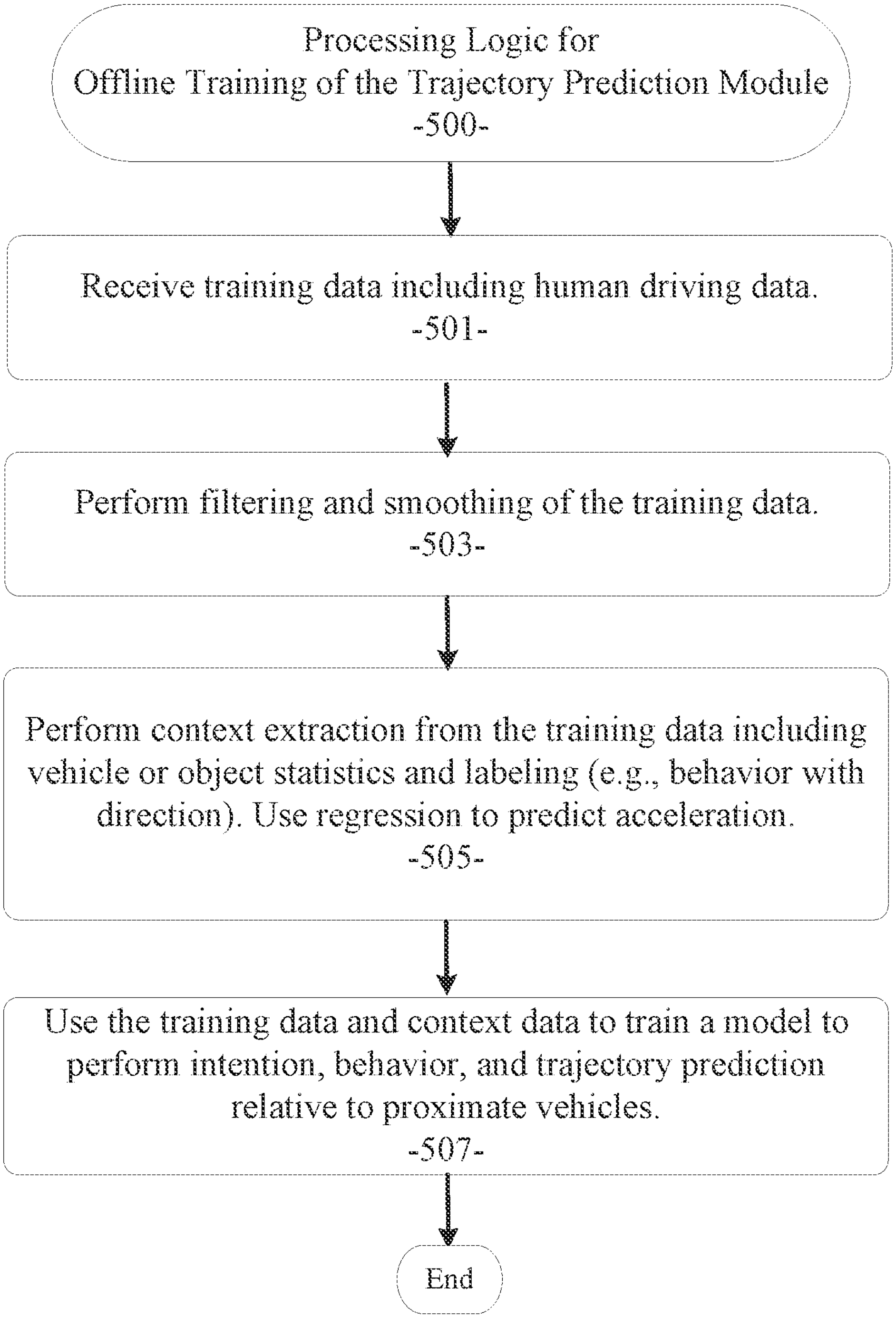
FIG. 5 illustrates an operational or processing workflow for the offline training of the trajectory prediction module in an example embodiment.

FIG. 5 illustrates an operational or processing workflow 500 for the offline training of the trajectory prediction module 175 in an example embodiment. In operation block 501, the prediction-based trajectory planning system 202 can receive training data including human driving data from the training data collection system 201 as described above. The prediction-based trajectory planning system 202 can then perform filtering and smoothing of the training data (operation block 503). The smoothing can include removing spurious or outlier data. Then in operation block 505, context extraction is performed from the training data including extraction of vehicle or object statistics and labeling (e.g., vehicle or object behavior with direction). An example embodiment can use regression to predict acceleration (operation block 505). Finally, the training data collection system 201 can use the training data and context data to train the trajectory prediction module 175 to perform intention, behavior, and trajectory prediction relative to proximate vehicles (operation block 507).

Figure 6:
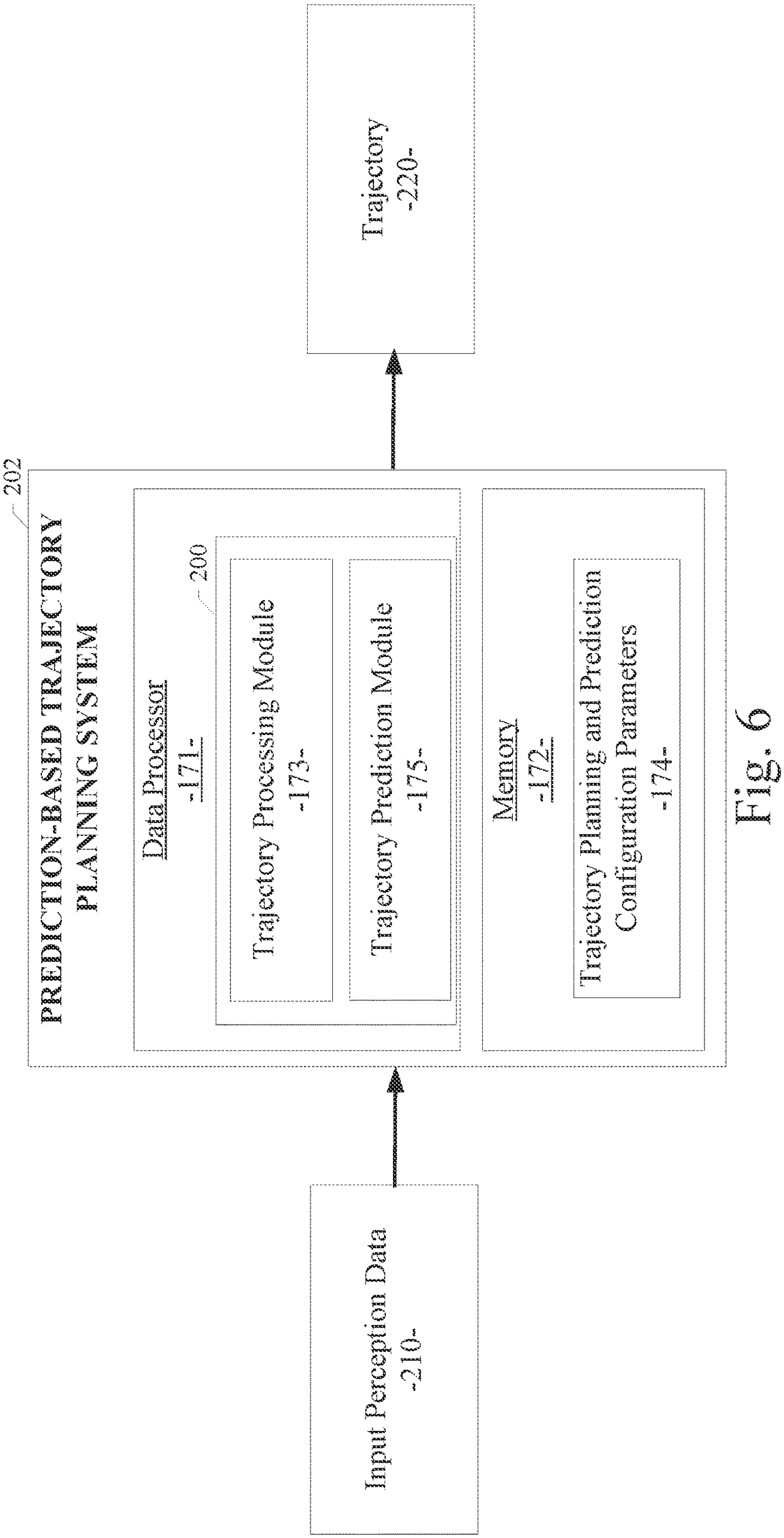
FIG. 6 illustrates an example embodiment of the components of the prediction-based trajectory planning system and the prediction-based trajectory planning module therein.

Referring now to FIG. 6, after the trajectory prediction module 175 of the prediction-based trajectory planning system 202 is trained in the offline training phase as described above, the trajectory prediction module 175 can be deployed in an operational phase of the prediction-based trajectory planning system 202. In the operational phase, the prediction-based trajectory planning system 202 can use the trained trajectory prediction module 175 to generate predicted vehicle or object trajectories based on a human driver behavior model as described above. The operational phase of the prediction-based trajectory planning system 202 is described in more detail below.

Referring again to FIG. 6, a diagram illustrates an example embodiment of the components of the prediction-based trajectory planning system 202 and the prediction-based trajectory planning module 200 therein. In the example embodiment, the prediction-based trajectory planning module 200 can be configured to include a trajectory processing module 173 and the trained trajectory prediction module 175. As described in more detail below, the trajectory processing module 173 serves to enable generation of a trajectory for the host vehicle (e.g., the autonomous vehicle). The trained trajectory prediction module 175 serves to enable generation of predicted trajectories of proximate vehicles near the host vehicle. The vehicle trajectories can be generated based on input perception data 210 received from one or more of the vehicle sensor subsystems 144, including one or more cameras, and processed by an image processing module to identify proximate agents (e.g., moving vehicles, dynamic objects, or other objects in the proximate vicinity of the host vehicle). The generated proximate vehicle trajectories are also based on the training of the trajectory prediction module 175 by the training data collection system 201 as described above. The trajectory processing module 173 and the trajectory prediction module 175 can be configured as software modules executed by the data processor 171 of the in-vehicle control system 150. The modules 173 and 175 of the prediction-based trajectory planning module 200 can receive the input perception data 210 and produce a trajectory 220, which can be used by the autonomous control subsystem of the vehicle control subsystem 146 to more efficiently and safely control the host vehicle 105. As part of their trajectory planning processing, the trajectory processing module 173 and the trajectory prediction module 175 can be configured to work with trajectory planning and prediction configuration parameters 174, which can be used to customize and fine tune the operation of the prediction-based trajectory planning module 200. The trajectory planning and prediction configuration parameters 174 can be stored in a memory 172 of the in-vehicle control system 150.

In the example embodiment, the prediction-based trajectory planning module 200 can be configured to include an interface with the in-vehicle control system 150, as shown in FIG. 1, through which the prediction-based trajectory planning module 200 can send and receive data as described herein. Additionally, the prediction-based trajectory planning module 200 can be configured to include an interface with the in-vehicle control system 150 and/or other ecosystem 101 subsystems through which the prediction-based trajectory planning module 200 can receive ancillary data from the various data sources described above. As described above, the prediction-based trajectory planning module 200 can also be implemented in systems and platforms that are not deployed in a vehicle and not necessarily used in or with a vehicle.

In an example embodiment as shown in FIG. 6, the prediction-based trajectory planning module 200 can be configured to include the trajectory processing module 173 and the trained trajectory prediction module 175, as well as other processing modules not shown for clarity. Each of these modules can be implemented as software, firmware, or other logic components executing or activated within an executable environment of the prediction-based trajectory planning module 200 operating within or in data communication with the in-vehicle control system 150. Each of these modules of an example embodiment is described in more detail below in connection with the figures provided herein.

As a result of the processing performed by the prediction-based trajectory planning system 202, data corresponding to predicted or simulated vehicle behaviors and predicted or simulated vehicle or object trajectories can be produced and fed back into the prediction-based trajectory planning system 202 to improve the accuracy of the predicted trajectories. Ultimately, the improved prediction-based trajectory planning system 202 can be used to provide highly accurate predicted traffic trajectory information to a user or for configuration of a control system of an autonomous vehicle. In a particular example, the predicted or simulated traffic trajectory information can be provided to a system component used to create a virtual world where a control system for an autonomous vehicle can be trained and improved. The virtual world is configured to be identical (as possible) to the real world where vehicles are operated by human drivers. In other words, the predicted or simulated traffic trajectory information generated by the prediction-based trajectory planning system 202 is directly and indirectly useful for configuring the control systems for an autonomous vehicle. It will be apparent to those of ordinary skill in the art that the prediction-based trajectory planning system 202 and the predicted or simulated traffic trajectory information described and claimed herein can be implemented, configured, processed, and used in a variety of other applications and systems as well.

Referring again to FIG. 6, the prediction-based trajectory planning module 200, and the trajectory processing module 173 therein, can receive input perception data 210 from one or more of the vehicle sensor subsystems 144, including one or more cameras. The image data from the vehicle sensor subsystems 144 can be processed by an image processing module to identify proximate agents or other objects (e.g., moving vehicles, dynamic objects, or other objects in the proximate vicinity of the vehicle 105). The process of semantic segmentation can be used for this purpose. The information related to the identified proximate agents or other objects can be received by the prediction-based trajectory planning module 200, and the trajectory processing module 173 therein, as input perception data 210. The trajectory processing module 173 can use the input perception data 210 as part of a trajectory planning process. In particular, the trajectory processing module 173 can initially generate a first proposed trajectory for the host autonomous vehicle 105. The first proposed trajectory can correspond to a particular path for navigating the vehicle 105 to a desired waypoint or destination. The first proposed trajectory can also correspond to a particular path for controlling the vehicle 105 to avoid obstacles detected in the proximity of the host vehicle 105. The first proposed trajectory can also correspond to a particular path for directing the host vehicle 105 to perform a particular action, such as passing another vehicle, adjusting speed or heading to maintain separation from other vehicles, maneuvering the vehicle in turns, performing a controlled stop, or the like. In each of these cases, the first proposed trajectory may cause the host vehicle 105 to make a sequential change to its speed and/or heading. As a result of changes in the host vehicle's 105 speed or heading, other agents or vehicles on the roadway proximate to the host vehicle 105 may react to the host vehicle's 105 change in speed, heading, other action, and/or context. The trained trajectory prediction module 175 is provided in an example embodiment to anticipate or predict the likely actions or reactions of the proximate agents to the host vehicle's 105 change in context (e.g., speed, heading, or the like). Thus, the trajectory processing module 173 can provide the first proposed trajectory of the host vehicle 105 in combination with the predicted trajectories of proximate agents produced by the trajectory prediction module 175. The trajectory prediction module 175 can generate the likely trajectories, or a distribution of likely trajectories of proximate agents, which are predicted to result from the context of the host vehicle 105 (e.g., following the first proposed trajectory). These likely or predicted trajectories of proximate agents can be determined based on the machine learning techniques configured from the training scenarios produced from prior real-world human driver behavior model data collections gathered and assimilated into training data using the training data collection system 201 as described above. These likely or predicted trajectories can also be configured or tuned using the configuration data 174. Over the course of collecting data from many human driver behavior model driving scenarios and training machine datasets and rule sets (or neural nets or the like), the likely or predicted trajectories of proximate agents can be determined with a variable level of confidence or probability. The confidence level or probability value related to a particular predicted trajectory can be retained or associated with the predicted trajectory of each proximate agent detected to be near the host vehicle 105 at a point in time corresponding to the desired execution of the first proposed trajectory. The trajectory prediction module 175 can generate these predicted trajectories and confidence levels for each proximate agent relative to the context of the host vehicle 105. The trajectory prediction module 175 can generate the predicted trajectories and corresponding confidence levels for each proximate agent as an output relative to the context of the host vehicle 105. The trajectory processing module 173 can use the predicted trajectories and corresponding confidence levels for each proximate agent as generated by the trajectory prediction module 175 to determine if any of the predicted trajectories for the proximate agents may cause the host vehicle 105 to violate a pre-defined goal based on a related score being below a minimum acceptable threshold. The trajectory processing module 173 can score the first proposed trajectory as related to the predicted trajectories for any of the proximate agents. The score for the first proposed trajectory relates to the level to which the first proposed trajectory complies with pre-defined goals for the host vehicle 105, including safety, efficiency, legality, passenger comfort, and the like. Minimum score thresholds for each goal can be pre-defined. For example, score thresholds related to turning rates, acceleration or stopping rates, speed, spacing, etc. can be pre-defined and used to determine if a proposed trajectory for host vehicle 105 may violate a pre-defined goal. If the score for the first proposed trajectory, as generated by the trajectory processing module 173 based on the predicted trajectories for any of the proximate agents, may violate a pre-defined goal, the trajectory processing module 173 can reject the first proposed trajectory and the trajectory processing module 173 can generate a second proposed trajectory. The second proposed trajectory and the current context of the host vehicle 105 can be provided to the trajectory prediction module 175 for the generation of a new set of predicted trajectories and confidence levels for each proximate agent as related to the second proposed trajectory and the context of the host vehicle 105. The new set of predicted trajectories and confidence levels for each proximate agent as generated by the trajectory prediction module 175 can be output from the trajectory prediction module 175 and provided to the trajectory processing module 173. Again, the trajectory processing module 173 can use the predicted trajectories and confidence levels for each proximate agent corresponding to the second proposed trajectory to determine if any of the predicted trajectories for the proximate agents may cause the vehicle 105 to violate a pre-defined goal based on a related score being below a minimum acceptable threshold. If the score for the second proposed trajectory, as generated by the trajectory processing module 173 based on the new set of predicted trajectories for any of the proximate agents, may violate a pre-defined goal, the trajectory processing module 173 can reject the second proposed trajectory and the trajectory processing module 173 can generate a third proposed trajectory. This process can be repeated until a proposed trajectory generated by the trajectory processing module 173 and processed by the trajectory prediction module 175 results in predicted trajectories and confidence levels for each proximate agent that cause the proposed trajectory for the host vehicle 105 to satisfy the pre-defined goals based on the a related score being at or above a minimum acceptable threshold. Alternatively, the process can be repeated until a time period or iteration count is exceeded. If the process of an example embodiment as described above results in predicted trajectories, confidence levels, and related scores that satisfy the pre-defined goals, the corresponding proposed trajectory 220 is provided as an output from the prediction-based trajectory planning module 200 as shown in FIG. 6.

Figure 7:
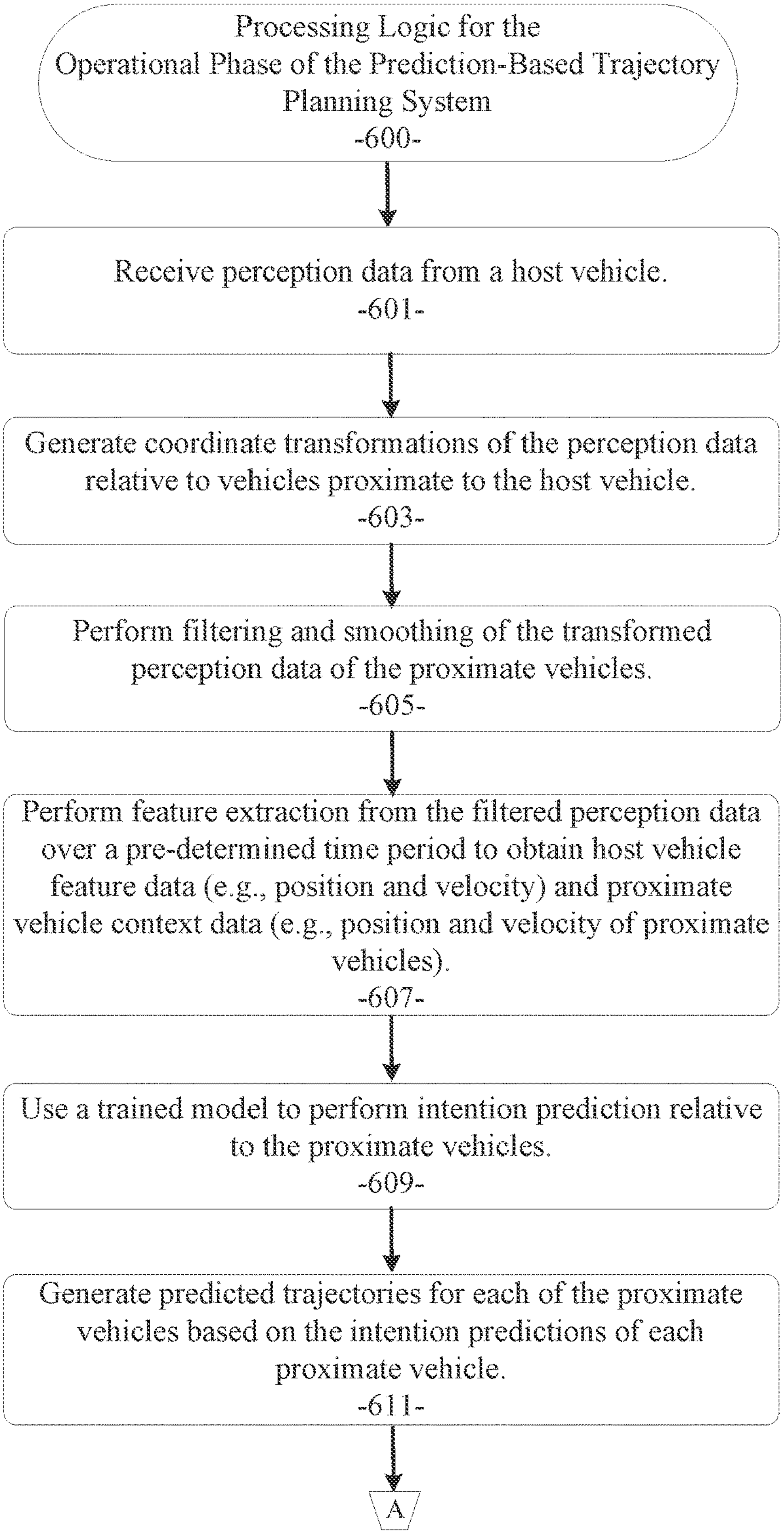
FIGS. 7 and 8 illustrate an operational or processing workflow for the operational phase use of the prediction-based trajectory planning system in an example embodiment.
Figure 8:
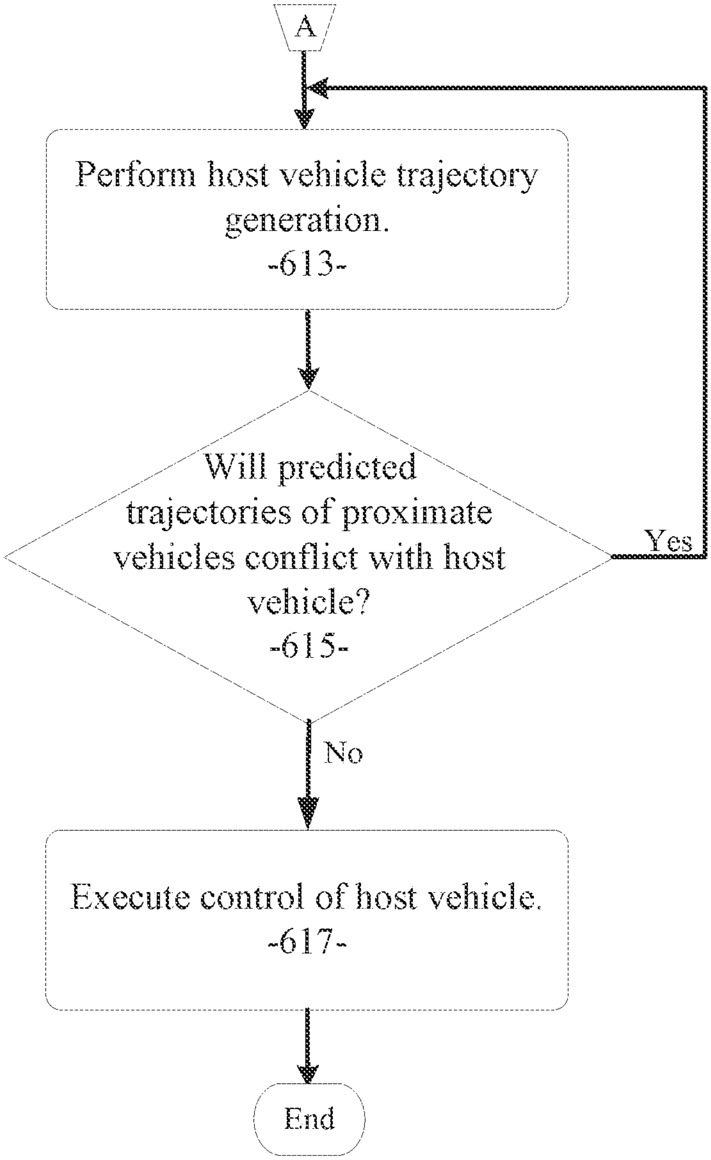

FIGS. 7 and 8 illustrate an operational or processing workflow 600 for the operational phase use of the prediction-based trajectory planning system 202 in an example embodiment. In operation block 601 shown in FIG. 7, the prediction-based trajectory planning system 202 receives perception data 210 from a host vehicle. The perception data can include sensor data from sensors (e.g., cameras, LIDAR, radar, etc.) mounted on or used in connection with the host vehicle 105. In operation block 603, the prediction-based trajectory planning system 202 can use the received perception data to generate coordinate transformations of the perception data relative to vehicles proximate to the host vehicle. In a particular embodiment, the position of each proximate vehicle relative to the host vehicle can be determined. The coordinates can be transformed to world coordinates or the (l,d) coordinate system as described above. As a result, the perception data from the host vehicle can be used to determine a context of each of the proximate vehicles near the host vehicle. The transformed perception data for the proximate vehicles can be filtered and smoothed in operation block 605. The data smoothing can include removing noise, spurious data, and outlier data. In a particular embodiment, a Gaussian filter can be used. Once the transformed perception data is filtered and smoothed, feature and context extraction from the data can be performed in operation block 607. The feature and context extraction is performed from the transformed and filtered perception data over a pre-determined time period to obtain host vehicle feature data (e.g., position and velocity, etc.) and proximate vehicle context data (e.g., position and velocity of proximate vehicles, etc.). Having obtained the host vehicle feature data and the proximate vehicle context data, the prediction-based trajectory planning system 202 can employ the trained trajectory prediction module 175 or any other machine learning components to generate intention or behavior and trajectory prediction relative to the proximate vehicles as described above (operation block 609). Based on the intention or behavior and trajectory predictions relative to the proximate vehicles, the trajectory prediction module 175 can generate predicted trajectories for each of the proximate vehicles using a specific motion planning process based on the predicted intention or behavior of each proximate vehicle (operation block 611). For example, the trained trajectory prediction module 175 may determine that a particular proximate vehicle is likely to execute a left accelerating turn based on the training data and the vehicle context. In this particular example, the trained trajectory prediction module 175 may correspondingly generate a trajectory for the particular proximate vehicle including a path and speed/acceleration for the left accelerating turn. Processing for the operational or processing workflow 600 shown in FIG. 7 then continues at the connector labeled "A" shown in FIG. 8.

Referring now to FIG. 8, the operational or processing workflow 600 continues at the connector labeled "A." In operation block 611 shown in FIG. 7, the trajectory prediction module 175 generated predicted trajectories for each of the proximate vehicles based on the predicted intention or behavior of each proximate vehicle. At this point, an example embodiment can generate a proposed trajectory for the host vehicle in operation block 613. If the proposed trajectory for the host vehicle generated in operation block 613 will conflict with any of the predicted trajectories of the proximate vehicles generated in operation block 611 (i.e., the "Yes" branch of decision block 615), processing control returns to operation block 613 where the proposed trajectory for the host vehicle is revised, modified, and/or re-generated. A conflict occurs when any of the predicted trajectories of the proximate vehicles would intersect with or approach too closely to the proposed trajectory of the host vehicle. The prediction-based trajectory planning system 202 will enforce safety zones and thresholds to make sure that safety is observed, conflicts are eliminated, and collisions are avoided. The loop between operation block 613 and decision block 615 will continue until the proposed trajectory for the host vehicle generated in operation block 613 does not conflict with any of the predicted trajectories of the proximate vehicles generated in operation block 611 (i.e., the "No" branch of decision block 615). In this case, processing control passes to operation block 617 where the proposed trajectory for the host vehicle is executed and control of host vehicle is directed along the proposed trajectory, which will not be in conflict with any of the proximate vehicles.

Figure 9:
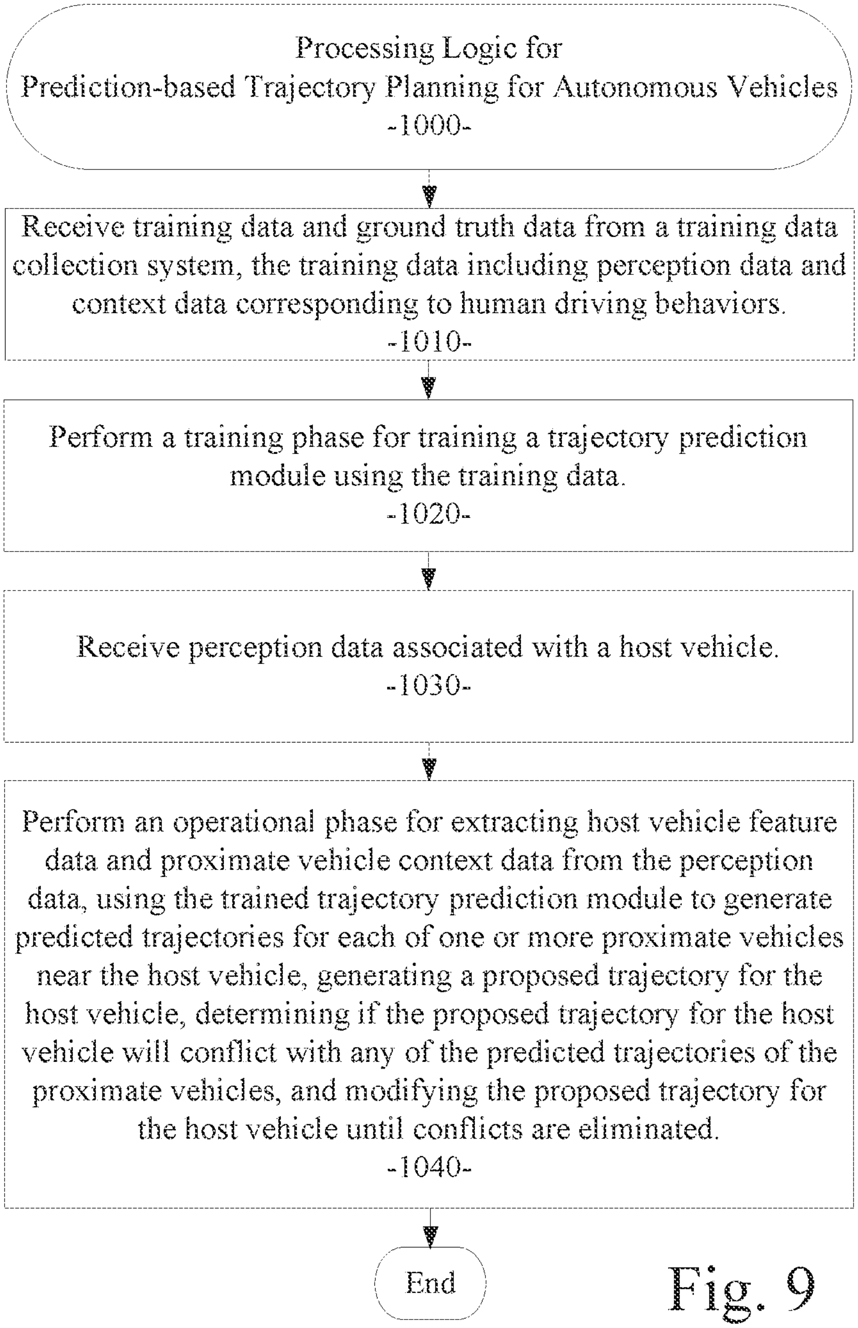
FIG. 9 is a process flow diagram illustrating an example embodiment of a prediction-based system and method for trajectory planning of autonomous vehicles.

Referring now to FIG. 9, a flow diagram illustrates an example embodiment of a system and method 1000 for providing prediction-based trajectory planning of autonomous vehicles. The example embodiment can be configured to: receive training data and ground truth data from a training data collection system, the training data including perception data and context data corresponding to human driving behaviors (processing block 1010); perform a training phase for training a trajectory prediction module using the training data (processing block 1020); receive perception data associated with a host vehicle (processing block 1030); and perform an operational phase for extracting host vehicle feature data and proximate vehicle context data from the perception data, using the trained trajectory prediction module to generate predicted trajectories for each of one or more proximate vehicles near the host vehicle, generating a proposed trajectory for the host vehicle, determining if the proposed trajectory for the host vehicle will conflict with any of the predicted trajectories of the proximate vehicles, and modifying the proposed trajectory for the host vehicle until conflicts are eliminated (processing block 1040).

Alternative Embodiment of the Prediction-Based System and Method for Trajectory Planning of Autonomous Vehicles As described in various example embodiments, a prediction-based system and method for trajectory planning of autonomous vehicles are described herein. In particular example embodiments, the system herein may include various sensors configured to collect perception data, a computing device, and a trained trajectory prediction module for predicting a trajectory of other vehicles and/or dynamic objects in the vicinity of (proximate to) the host autonomous vehicle. In example embodiments described above, the computing device uses the trained trajectory prediction module to predict trajectories of vehicles and/or dynamic objects proximate to the host autonomous vehicle based on training data including human driver behavior data. Then, the example embodiments described above generate a proposed trajectory for the host vehicle and check for conflicts between the proposed host vehicle trajectory and any of the predicted trajectories of the proximate vehicles. If conflicts are detected, the proposed host vehicle trajectory is modified accordingly.

In an alternative embodiment of the system and methods described herein, the alternative embodiments can first generate a proposed trajectory for the host vehicle and then use the trained trajectory prediction module to predict trajectories of vehicles and/or dynamic objects proximate to the host autonomous vehicle, if the host vehicle were to traverse the proposed trajectory. In this manner, the trained trajectory prediction module can generate the predicted trajectories of the proximate vehicles as the proximate vehicles would likely react to the proposed host vehicle trajectory. As in the example embodiments described above, the alternative embodiments can also check for conflicts between the proposed host vehicle trajectory and any of the predicted trajectories of the proximate vehicles. If conflicts are detected, the proposed host vehicle trajectory is modified accordingly.

In support of the alternative example embodiments, the training of the trajectory prediction module 175 during the offline training phase can be slightly modified. In particular, the training data collection system 201 can collect human driving data that classifies human driving behavior data into at least one of a plurality of different scenarios based on particular actions performed by the vehicle. For example, the training data can include data representing vehicle actions such as, turning left or right, maintaining a straight direction, accelerating or decelerating, performing an accelerating or decelerating turn, passing another vehicle, or the like. The labeling data described above can be used to represent these different driving scenarios and actions. Additionally, the training data can include data representing actions taken by proximate vehicles in reaction to the different driving scenarios and actions performed by a test vehicle. As a result, the training data can include human driver behavior data related to how drivers typically react to actions performed by proximate vehicles. This data can be used in the alternative embodiments to determine or predict the likely actions or reactions by proximate vehicles when the host vehicle performs a particular action or follows a particular trajectory. This training data can be used by the trained trajectory prediction module 175 during the operational phase in the alternative embodiments to anticipate the likely actions of proximate vehicles if the host vehicle executes a particular proposed trajectory. By anticipating or predicting the likely actions or reactions of proximate vehicles, the alternative embodiments can determine if the proposed host vehicle trajectory would be safe and not conflict with any of the predicted trajectories of the proximate vehicles. Based on this determination, the proposed host vehicle trajectory can be modified, if necessary, to eliminate any conflicts with proximate vehicles.

Figure 10:
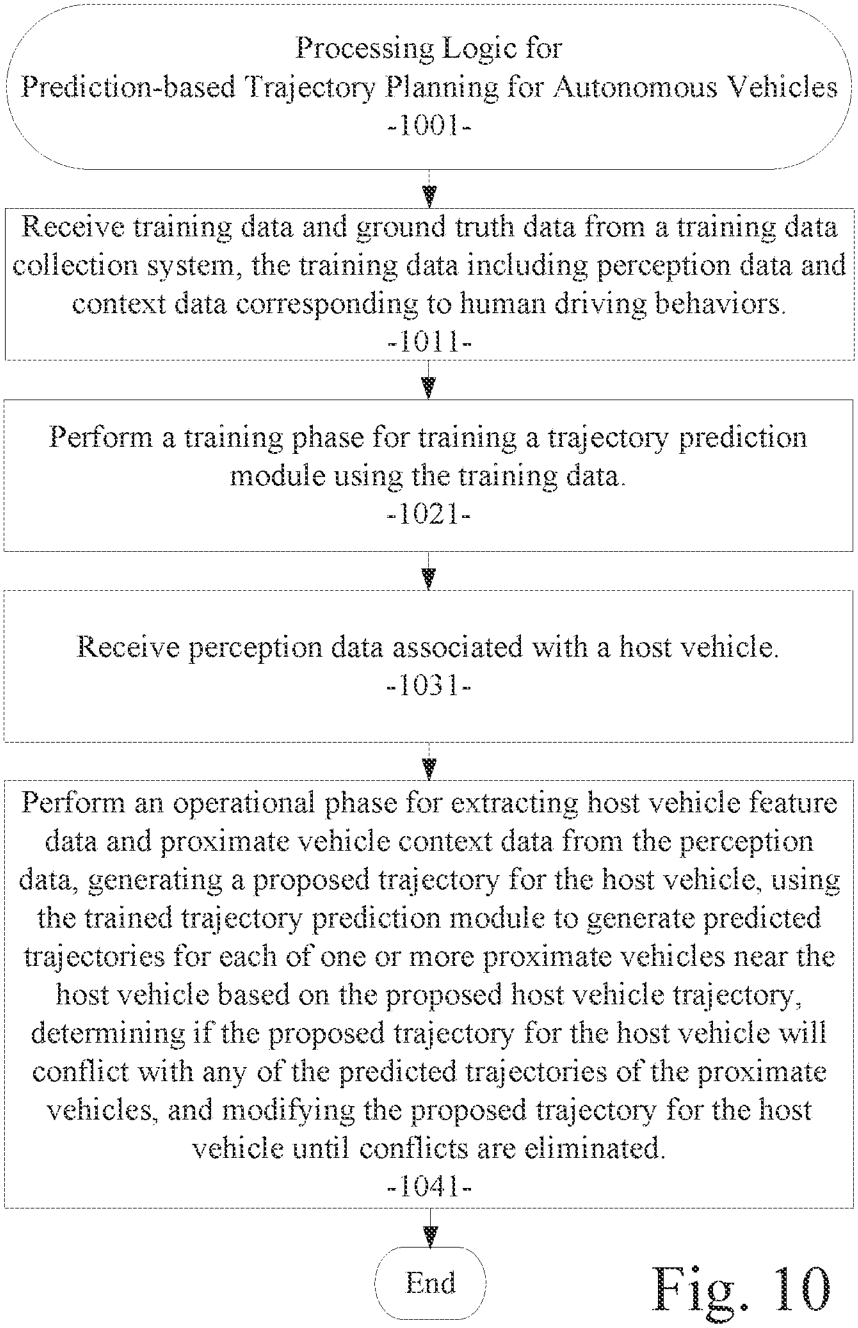
FIG. 10 is a process flow diagram illustrating an alternative example embodiment of a prediction-based system and method for trajectory planning of autonomous vehicles.

Referring now to FIG. 10, a flow diagram illustrates the alternative example embodiment of a system and method 1001 for providing prediction-based trajectory planning of autonomous vehicles. The example embodiment can be configured to: receive training data and ground truth data from a training data collection system, the training data including perception data and context data corresponding to human driving behaviors (processing block 1011); perform a training phase for training a trajectory prediction module using the training data (processing block 1021); receive perception data associated with a host vehicle (processing block 1031); and perform an operational phase for extracting host vehicle feature data and proximate vehicle context data from the perception data, generating a proposed trajectory for the host vehicle, using the trained trajectory prediction module to generate predicted trajectories for each of one or more proximate vehicles near the host vehicle based on the proposed host vehicle trajectory, determining if the proposed trajectory for the host vehicle will conflict with any of the predicted trajectories of the proximate vehicles, and modifying the proposed trajectory for the host vehicle until conflicts are eliminated (processing block 1041).

As used herein and unless specified otherwise, the term "mobile device" includes any computing or communications device that can communicate with the in-vehicle control system 150 and/or the prediction-based trajectory planning module 200 described herein to obtain read or write access to data signals, messages, or content communicated via any mode of data communications. In many cases, the mobile device 130 is a handheld, portable device, such as a smart phone, mobile phone, cellular telephone, tablet computer, laptop computer, display pager, radio frequency (RF) device, infrared (IR) device, global positioning device (GPS), Personal Digital Assistants (PDA), handheld computers, wearable computer, portable game console, other mobile communication and/or computing device, or an integrated device combining one or more of the preceding devices, and the like. Additionally, the mobile device 130 can be a computing device, personal computer (PC), multiprocessor system, microprocessor-based or programmable consumer electronic device, network PC, diagnostics equipment, a system operated by a vehicle 119 manufacturer or service technician, and the like, and is not limited to portable devices. The mobile device 130 can receive and process data in any of a variety of data formats. The data format may include or be configured to operate with any programming format, protocol, or language including, but not limited to, JavaScript, C++, IOS, Android, etc.

As used herein and unless specified otherwise, the term "network resource" includes any device, system, or service that can communicate with the in-vehicle control system 150 and/or the prediction-based trajectory planning module 200 described herein to obtain read or write access to data signals, messages, or content communicated via any mode of inter-process or networked data communications. In many cases, the network resource 122 is a data network accessible computing platform, including client or server computers, websites, mobile devices, peer-to-peer (P2P) network nodes, and the like. Additionally, the network resource 122 can be a web appliance, a network router, switch, bridge, gateway, diagnostics equipment, a system operated by a vehicle 119 manufacturer or service technician, or any machine capable of executing a set of instructions (sequential or otherwise) that specify actions to be taken by that machine. Further, while only a single machine is illustrated, the term "machine" can also be taken to include any collection of machines that individually or jointly execute a set (or multiple sets) of instructions to perform any one or more of the methodologies discussed herein. The network resources 122 may include any of a variety of providers or processors of network transportable digital content. Typically, the file format that is employed is Extensible Markup Language (XML), however, the various embodiments are not so limited, and other file formats may be used. For example, data formats other than Hypertext Markup Language (HTML)/XML or formats other than open/standard data formats can be supported by various embodiments. Any electronic file format, such as Portable Document Format (PDF), audio (e.g., Motion Picture Experts Group Audio Layer 3—MP3, and the like), video (e.g., MP4, and the like), and any proprietary interchange format defined by specific content sites can be supported by the various embodiments described herein.

The wide area data network 120 (also denoted the network cloud) used with the network resources 122 can be configured to couple one computing or communication device with another computing or communication device. The network may be enabled to employ any form of computer readable data or media for communicating information from one electronic device to another. The network 120 can include the Internet in addition to other wide area networks (WANs), cellular telephone networks, metro-area networks, local area networks (LANs), other packet-switched networks, circuit-switched networks, direct data connections, such as through a universal serial bus (USB) or Ethernet port, other forms of computer-readable media, or any combination thereof. The network 120 can include the Internet in addition to other wide area networks (WANs), cellular telephone networks, satellite networks, over-the-air broadcast networks, AM/FM radio networks, pager networks, UHF networks, other broadcast networks, gaming networks, WiFi networks, peer-to-peer networks, Voice Over IP (VoIP) networks, metro-area networks, local area networks (LANs), other packet-switched networks, circuit-switched networks, direct data connections, such as through a universal serial bus (USB) or Ethernet port, other forms of computer-readable media, or any combination thereof. On an interconnected set of networks, including those based on differing architectures and protocols, a router or gateway can act as a link between networks, enabling messages to be sent between computing devices on different networks. Also, communication links within networks can typically include twisted wire pair cabling, USB, Firewire, Ethernet, or coaxial cable, while communication links between networks may utilize analog or digital telephone lines, full or fractional dedicated digital lines including T1, T2, T3, and T4, Integrated Services Digital Networks (ISDNs), Digital User Lines (DSLs), wireless links including satellite links, cellular telephone links, or other communication links known to those of ordinary skill in the art. Furthermore, remote computers and other related electronic devices can be remotely connected to the network via a modem and temporary telephone link.

The network 120 may further include any of a variety of wireless sub-networks that may further overlay stand-alone ad-hoc networks, and the like, to provide an infrastructure-oriented connection. Such sub-networks may include mesh networks, Wireless LAN (WLAN) networks, cellular networks, and the like. The network may also include an autonomous system of terminals, gateways, routers, and the like connected by wireless radio links or wireless transceivers. These connectors may be configured to move freely and randomly and organize themselves arbitrarily, such that the topology of the network may change rapidly. The network 120 may further employ one or more of a plurality of standard wireless and/or cellular protocols or access technologies including those set forth herein in connection with network interface 712 and network 714 described in the figures herewith.

In a particular embodiment, a mobile device 132 and/or a network resource 122 may act as a client device enabling a user to access and use the in-vehicle control system 150 and/or the prediction-based trajectory planning module 200 to interact with one or more components of a vehicle subsystem. These client devices 132 or 122 may include virtually any computing device that is configured to send and receive information over a network, such as network 120 as described herein. Such client devices may include mobile devices, such as cellular telephones, smart phones, tablet computers, display pagers, radio frequency (RF) devices, infrared (IR) devices, global positioning devices (GPS), Personal Digital Assistants (PDAs), handheld computers, wearable computers, game consoles, integrated devices combining one or more of the preceding devices, and the like. The client devices may also include other computing devices, such as personal computers (PCs), multiprocessor systems, microprocessor-based or programmable consumer electronics, network PC's, and the like. As such, client devices may range widely in terms of capabilities and features. For example, a client device configured as a cell phone may have a numeric keypad and a few lines of monochrome LCD display on which only text may be displayed. In another example, a web-enabled client device may have a touch sensitive screen, a stylus, and a color LCD display screen in which both text and graphics may be displayed. Moreover, the web-enabled client device may include a browser application enabled to receive and to send wireless application protocol messages (WAP), and/or wired application messages, and the like. In one embodiment, the browser application is enabled to employ HyperText Markup Language (HTML), Dynamic HTML, Handheld Device Markup Language (HDML), Wireless Markup Language (WML), WMLScript, JavaScript™, EXtensible HTML (xHTML), Compact HTML (CHTML), and the like, to display and send a message with relevant information.

The client devices may also include at least one client application that is configured to receive content or messages from another computing device via a network transmission. The client application may include a capability to provide and receive textual content, graphical content, video content, audio content, alerts, messages, notifications, and the like. Moreover, the client devices may be further configured to communicate and/or receive a message, such as through a Short Message Service (SMS), direct messaging (e.g., Twitter), email, Multimedia Message Service (MMS), instant messaging (IM), internet relay chat (IRC), mIRC, Jabber, Enhanced Messaging Service (EMS), text messaging, Smart Messaging, Over the Air (OTA) messaging, or the like, between another computing device, and the like. The client devices may also include a wireless application device on which a client application is configured to enable a user of the device to send and receive information to/from network resources wirelessly via the network.

The in-vehicle control system 150 and/or the prediction-based trajectory planning module 200 can be implemented using systems that enhance the security of the execution environment, thereby improving security and reducing the possibility that the in-vehicle control system 150 and/or the prediction-based trajectory planning module 200 and the related services could be compromised by viruses or malware. For example, the in-vehicle control system 150 and/or the prediction-based trajectory planning module 200 can be implemented using a Trusted Execution Environment, which can ensure that sensitive data is stored, processed, and communicated in a secure way.

Figure 11:
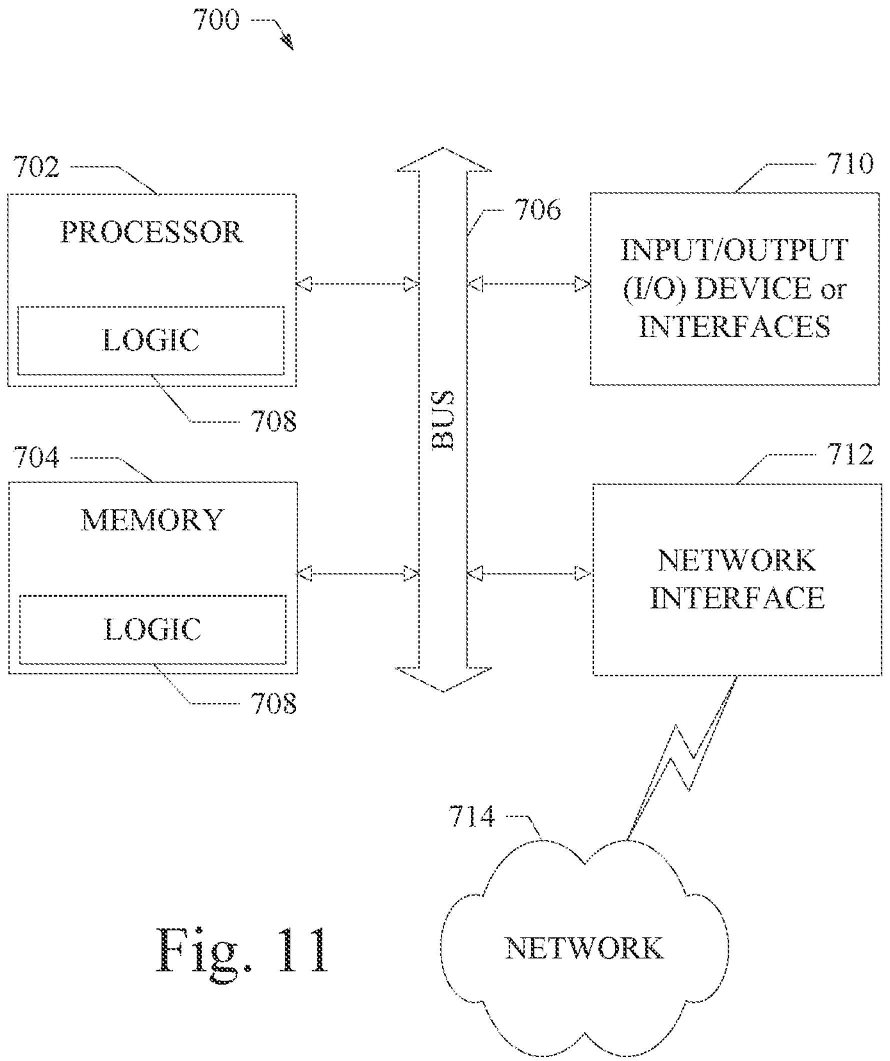
FIG. 11 shows a diagrammatic representation of machine in the example form of a computer system within which a set of instructions when executed may cause the machine to perform any one or more of the methodologies discussed herein.

FIG. 11 shows a diagrammatic representation of a machine in the example form of a computing system 700 within which a set of instructions when executed and/or processing logic when activated may cause the machine to perform any one or more of the methodologies described and/or claimed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a laptop computer, a tablet computing system, a Personal Digital Assistant (PDA), a cellular telephone, a smartphone, a web appliance, a set-top box (STB), a network router, switch or bridge, or any machine capable of executing a set of instructions (sequential or otherwise) or activating processing logic that specify actions to be taken by that machine. Further, while only a single machine is illustrated, the term "machine" can also be taken to include any collection of machines that individually or jointly execute a set (or multiple sets) of instructions or processing logic to perform any one or more of the methodologies described and/or claimed herein.

The example computing system 700 can include a data processor 702 (e.g., a System-on-a-Chip (SoC), general processing core, graphics core, and optionally other processing logic) and a memory 704, which can communicate with each other via a bus or other data transfer system 706. The mobile computing and/or communication system 700 may further include various input/output (I/O) devices and/or interfaces 710, such as a touchscreen display, an audio jack, a voice interface, and optionally a network interface 712. In an example embodiment, the network interface 712 can include one or more radio transceivers configured for compatibility with any one or more standard wireless and/or cellular protocols or access technologies (e.g., 2nd (2G), 2.5, 3rd (3G), 4th (4G) generation, and future generation radio access for cellular systems, Global System for Mobile communication (GSM), General Packet Radio Services (GPRS), Enhanced Data GSM Environment (EDGE), Wideband Code Division Multiple Access (WCDMA), LTE, CDMA2000, WLAN, Wireless Router (WR) mesh, and the like). Network interface 712 may also be configured for use with various other wired and/or wireless communication protocols, including TCP/IP, UDP, SIP, SMS, RTP, WAP, CDMA, TDMA, UMTS, UWB, WiFi, WiMax, Bluetooth™, IEEE 802.11x, and the like. In essence, network interface 712 may include or support virtually any wired and/or wireless communication and data processing mechanisms by which information/data may travel between a computing system 700 and another computing or communication system via network 714.

The memory 704 can represent a machine-readable medium on which is stored one or more sets of instructions, software, firmware, or other processing logic (e.g., logic 708) embodying any one or more of the methodologies or functions described and/or claimed herein. The logic 708, or a portion thereof, may also reside, completely or at least partially within the processor 702 during execution thereof by the mobile computing and/or communication system 700. As such, the memory 704 and the processor 702 may also constitute machine-readable media. The logic 708, or a portion thereof, may also be configured as processing logic or logic, at least a portion of which is partially implemented in hardware. The logic 708, or a portion thereof, may further be transmitted or received over a network 714 via the network interface 712. While the machine-readable medium of an example embodiment can be a single medium, the term "machine-readable medium" should be taken to include a single non-transitory medium or multiple non-transitory media (e.g., a centralized or distributed database, and/or associated caches and computing systems) that store the one or more sets of instructions. The term "machine-readable medium" can also be taken to include any non-transitory medium that is capable of storing, encoding or carrying a set of instructions for execution by the machine and that cause the machine to perform any one or more of the methodologies of the various embodiments, or that is capable of storing, encoding or carrying data structures utilized by or associated with such a set of instructions. The term "machine-readable medium" can accordingly be taken to include, but not be limited to, solid-state memories, optical media, and magnetic media.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A system comprising:

at least one data processor; and a prediction-based trajectory planning module, executable by the at least one data processor, configured to:

receive a proposed trajectory for a host vehicle;

generate, based on human driving behavior context data if the host vehicle follows the proposed host vehicle trajectory, predicted trajectories for each of one or more dynamic objects in proximity to the host vehicle, the predicted trajectories for each of the one or more proximate dynamic objects corresponding to likely actions or reactions by each of the one or more proximate dynamic objects; and cause modification of the proposed host vehicle trajectory if the proposed host vehicle trajectory will conflict with any of the predicted trajectories of the one or more proximate dynamic objects;

wherein the system is configured to use regression model to predict acceleration for each of the one or more proximate objects near the host vehicle;

wherein prediction-based trajectory planning module is further configured to:

determine if the predicted trajectories cause the proposed trajectory to violate a pre-defined goal based on a related score being below a minimum acceptable threshold;

upon determination that the proposed trajectory violates the pre-defined goal, reject the proposed trajectory and generate a new proposed trajectory for the host vehicle;

generate new predicted trajectories for each of one or more proximate vehicles based on a current context of the host vehicle; and determine if the new predicted trajectories cause the new proposed trajectory to violate the pre-defined goal.

2. The system of claim 1 being further configured to receive, filter, and smooth perception data.

3. The system of claim 1 being further configured to generate coordinate transformations of perception data relative to the one or more proximate dynamic objects by using a coordinate system (1, d) to define a location of the host vehicle relative to n proximate vehicle locations (P1, P2, . . . Pn), wherein 1 axis is aligned parallel with lane markers of a roadway and d axis is oriented perpendicularly to the 1 axis and the lane markers of the roadway.

4. The system of claim 1 being further configured to use training data comprising labeling data that includes context information defining directionality and rate behaviors of dynamic objects represented in the training data.

5. The system of claim 1 being further configured to use training data comprising labeling data that includes context information defining directionality and rate behaviors of dynamic objects represented in the training data, the context information defining directionality behaviors further defining a left turn, no turn, or a right turn, the context information defining rate behaviors further defining accelerating or decelerating.

6. The system of claim 1 wherein causing modification of the proposed host vehicle trajectory comprises:

determining if the proposed host vehicle trajectory will conflict with any of the predicted trajectories of the one or more proximate dynamic objects; and modifying the proposed host vehicle trajectory based on the determined conflicts until the conflicts are eliminated.

7. The system of claim 1 wherein a proposed host vehicle trajectory which does not violate the pre-defined goal is output to a vehicle control subsystem causing the host vehicle to follow the output proposed trajectory.

8. A method comprising:

receiving a proposed trajectory for a host vehicle;

generating, based on human driving behavior context data if the host vehicle follows the proposed host vehicle trajectory, predicted trajectories for each of one or more dynamic objects in proximity to the host vehicle, the predicted trajectories for each of the one or more proximate dynamic objects corresponding to likely actions or reactions by each of the one or more proximate dynamic objects; and causing modification of the proposed host vehicle trajectory if the proposed host vehicle trajectory will conflict with any of the predicted trajectories of the one or more proximate dynamic objects;

wherein the method further comprises: using regression model to predict acceleration of a dynamic object for each of the one or more proximate objects near the host vehicle;

wherein causing modification of the proposed host vehicle trajectory if the proposed host vehicle trajectory will conflict with any of the predicted trajectories of the one or more proximate dynamic objects comprises:

determine if the predicted trajectories cause the proposed trajectory to violate a pre-defined goal based on a related score being below a minimum acceptable threshold;

upon determination that the proposed trajectory violates the pre-defined goal, reject the proposed trajectory and generate a new proposed trajectory for the host vehicle;

generate new predicted trajectories for each of one or more proximate vehicles based on a current context of the host vehicle; and determine if the new predicted trajectories cause the new proposed trajectory to violate the pre-defined goal.

9. The method of claim 8 comprising obtaining proximate dynamic object position and proximate dynamic object velocity.

10. The method of claim 8 comprising determining a position of each proximate dynamic object relative to the host vehicle.

11. The method of claim 8 comprising obtaining training data including labeling data obtained from human labelers or automated labeling processes.

12. The method of claim 8 comprising determining if any of the predicted trajectories for the one or more proximate dynamic objects may cause the host vehicle to violate a pre-defined goal.

13. The method of claim 8 comprising causing the host vehicle to follow the proposed trajectory.

14. A non-transitory machine-readable storage medium embodying instructions which, when executed by a machine, cause the machine to:

receive a proposed trajectory for a host vehicle;

generate, based on human driving behavior context data if the host vehicle follows the proposed host vehicle trajectory, predicted trajectories for each of one or more dynamic objects in proximity to the host vehicle, the predicted trajectories for each of the one or more proximate dynamic objects corresponding to likely actions or reactions by each of the one or more proximate dynamic objects; and cause modification of the proposed host vehicle trajectory if the proposed host vehicle trajectory will conflict with any of the predicted trajectories of the one or more proximate dynamic objects;

wherein the instructions, when executed by a machine, further cause the machine to:

use regression model to predict acceleration for each of the one or more proximate objects near the host vehicle;

determine if the predicted trajectories cause the proposed trajectory to violate a pre-defined goal based on a related score being below a minimum acceptable threshold;

upon determination that the proposed trajectory violates the pre-defined goal, reject the proposed trajectory and generate a new proposed trajectory for the host vehicle;

generate new predicted trajectories for each of one or more proximate vehicles based on a current context of the host vehicle; and determine if the new predicted trajectories cause the new proposed trajectory to violate the pre-defined goal.

15. The non-transitory machine-readable storage medium of claim 14 being configured to generate predicted accelerations for each of the one or more proximate dynamic objects near the host vehicle.

16. The system of claim 1 is further configured to:

repeat a process of generating a proposed trajectory for the host vehicle and a process of determining if predicted trajectories for each of one or more proximate vehicles cause the proposed trajectory to violate the pre-defined goal until the predicted trajectories cause the proposed trajectory to satisfy the pre-defined goals.

17. The system of claim 1, wherein the pre-defined goals for the host vehicle comprise at least one of safety, efficiency, legality and passenger comfort;

the minimum acceptable thresholds related to at lease one of turning rates, acceleration or stopping rates, speed or spacing is pre-defined and used to determine if the proposed trajectory for host vehicle may violate a pre-defined goal.

18. The system of claim 1 is further configured to:

generate the predicted trajectories and confidence levels for each proximate dynamic objects relative to the context of the host vehicle.

19. The system of claim 1, wherein the context data comprises directionality and rate behaviors of each of the proximate dynamic objects.

20. The system of claim 4, wherein the training data comprises actual trajectories of vehicles and corresponding ground truth data under different scenarios and different driver actions and intentions in a context; and the scenarios are represented by at least one of an occupancy grid, a collection of vehicle states on a map, or a graphical representation.

* * * * *